United States Patent
Yun et al.

(10) Patent No.: US 10,306,633 B2
(45) Date of Patent: May 28, 2019

(54) APPARATUS AND METHOD FOR OPERATING RESOURCE IN WIRELESS COMMUNICATION SYSTEM

(71) Applicant: Samsung Electronics Co., Ltd., Suwon-si, Gyeonggi-do (KR)

(72) Inventors: Yeo-Hun Yun, Hwaseong-si (KR); Chan-Hong Kim, Hwaseong-si (KR); Tae-Young Kim, Seoul (KR); Kyeong-Yeon Kim, Hwaseong-si (KR); Ji-Yun Seol, Seongnam-si (KR); Yong-Ho Cho, Suwon-si (KR); Ming Hoka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 15/274,431

(22) Filed: Sep. 23, 2016

(65) Prior Publication Data
US 2017/0094663 A1    Mar. 30, 2017

(30) Foreign Application Priority Data
Sep. 25, 2015 (KR) .................. 10-2015-0136308

(51) Int. Cl.
*H04L 5/00* (2006.01)
*H04W 4/70* (2018.01)
(Continued)

(52) U.S. Cl.
CPC ......... *H04W 72/0453* (2013.01); *H04L 5/001* (2013.01); *H04L 5/0048* (2013.01);
(Continued)

(58) Field of Classification Search
None
See application file for complete search history.

(56) References Cited

U.S. PATENT DOCUMENTS

| | | | |
|---|---|---|---|
| 2007/0026810 A1* | 2/2007 | Love | H04B 7/063 455/67.11 |
| 2009/0154574 A1* | 6/2009 | Thurfjell | H04L 1/0003 375/259 |

(Continued)

FOREIGN PATENT DOCUMENTS

| | | |
|---|---|---|
| KR | 10-2016-0028818 A | 3/2016 |
| WO | 2014-119940 A1 | 8/2014 |
| WO | 2015-024994 A1 | 2/2015 |

OTHER PUBLICATIONS

Thorsten Wild et al., 5G air interface design based on Universal Filtered (UF-)OFDM, Proceedings of the 19th International Conference on Digital Signal Processing (DSP), Aug. 20-23, 2014.

(Continued)

*Primary Examiner* — Alpus Hsu
*Assistant Examiner* — Camquyen Thai
(74) *Attorney, Agent, or Firm* — Jefferson IP Law, LLP

(57) ABSTRACT

A method for operating a resource in a base station (BS) in a wireless communication system supporting multi-carrier is disclosed. The method includes acquiring reference information related to at least one resource block (RB) to be allocated to a user equipment (UE), determining a RB type to be used in the at least one RB based on the reference information, and transmitting, to the UE, information related to the RB type to be used in the at least one RB. The present disclosure relates to a communication method and system for converging a 5th-generation (5G) communication system for supporting higher data rates beyond a 4th-generation (4G) system with a technology for internet of things (IoT), which may be applied to intelligent services based on the 5G communication technology and the IoT-related technology.

22 Claims, 11 Drawing Sheets

(51) Int. Cl.
  *H04W 72/04*  (2009.01)
  *H04W 88/02*  (2009.01)
(52) U.S. Cl.
  CPC ............. *H04L 5/0057* (2013.01); *H04W 4/70* (2018.02); *H04W 88/02* (2013.01)

(56) References Cited

U.S. PATENT DOCUMENTS

| | | | |
|---|---|---|---|
| 2009/0245337 A1* | 10/2009 | Ramachandran | H04L 1/0025 375/224 |
| 2012/0189036 A1 | 7/2012 | Bellanger | |
| 2014/0185533 A1* | 7/2014 | Haub | H04L 5/00 370/329 |
| 2014/0269545 A1* | 9/2014 | Galeev | H04L 5/0026 370/329 |
| 2015/0049836 A1 | 2/2015 | Li et al. | |
| 2016/0057754 A1* | 2/2016 | Azizi | H04W 28/20 370/329 |
| 2016/0182105 A1* | 6/2016 | Alavi | H04B 1/525 455/78 |
| 2016/0330716 A1* | 11/2016 | Feng | H04W 72/04 |
| 2018/0069671 A1* | 3/2018 | Abdoli | H04L 5/0007 |

OTHER PUBLICATIONS

Gerhard Wunder et al., 5GNOW: Intermediate frame structure and transceiver concepts, Globecom Workshops (GC Wkshps), Dec. 8, 2014.

* cited by examiner

APPARATUS AND METHOD FOR OPERATING RESOURCE IN WIRELESS COMMUNICATION SYSTEM

CROSS-REFERENCE TO RELATED APPLICATION(S)

This application claims the benefit under 35 U.S.C. § 119(a) of a Korean patent application filed on Sep. 25, 2015 in the Korean Intellectual Property Office and assigned Serial number 10-2015-0136308, the entire disclosure of which is hereby incorporated by reference.

TECHNICAL FIELD

The present disclosure relates to an apparatus and method for operating a resource in a wireless communication system. More particularly, the present disclosure relates to an apparatus and method for operating a resource in a wireless communication system supporting multi-carrier (hereinafter, "multi-carrier system").

BACKGROUND

To meet the demand for wireless data traffic, which has increased since the deployment of 4th-generation (4G) communication systems, efforts have been made to develop an improved 5th-generation (5G) or pre-5G communication system. The 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed (or proposed) in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) (frequency and quadrature amplitude modulation (FQAM)) and a sliding window superposition coding (SWSC) as an advanced coding modulation (ACM) scheme, and a filter bank multi carrier (FBMC) scheme, a non-orthogonal multiple access (NOMA) scheme, and a sparse code multiple access (SCMA) scheme as an advanced access technology have been developed.

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Accordingly, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described big data processing technology may also be considered to be as an example of convergence between the 5G technology and the IoT technology.

Meanwhile, a significant increase in data rate in a wireless network has required a high frequency efficiency in a wireless communication system. For example, a wireless communication system with an enhanced frequency efficiency compared to a wireless communication system which is based on an orthogonal frequency division multiplexing (OFDM) scheme (e.g., an LTE system) has been required.

The OFDM scheme uses a guard band and a periodic cyclic prefix (CP). The use of the guard band and the CP may decrease a frequency efficiency in a system.

Generally, a frequency efficiency in a wireless communication system may be affected by self-interference amount and a spectrum confinement characteristic. For example, an FBMC scheme uses a filter which uses a good spectrum confinement characteristic, and the FBMC scheme improves a spectrum confinement characteristic which affects a frequency efficiency thereby a CP is unused or decreased.

Meanwhile, if a wireless communication system is able to decrease self-interference amount, the wireless communication system may support a high order-modulation and coding scheme (MCS) thereby improving a frequency efficiency.

As described above, if a wireless communication system is able to support a high order-modulation scheme by decreasing self-interference amount and decrease a guard band by improving a spectrum confinement characteristic, a frequency efficiency may be increased.

However, in a wireless communication system, it is very difficult to improve a spectrum confinement characteristic while decreasing self-interference amount. This is why there is a trade-off relation between the self-interference amount and the spectrum confinement characteristic, and this is proved by a "Balian-Low theorem". For example, if self-interference amount is 0 (zero), it is impossible that a spectrum confinement characteristic is completely confined within a predetermined band.

In the OFDM scheme, a self-interference amount is 0 (zero), but a spectrum confinement characteristic is relatively poor, as about 10% of an entire band needs to be allocated for a guard band. Further, an FBMC scheme which uses a filter with a good performance does not satisfy all of two characteristics, e.g., self-interference amount and a spectrum confinement characteristic.

The above information is presented as background information only to assist with an understanding of the present disclosure. No determination has been made, and no assertion is made, as to whether any of the above might be applicable as prior art with regard to the present disclosure.

SUMMARY

It is important to select a filter with the best performance, a size of a guard interval, and/or the like by considering various situations of a user equipment (UE). That is, it is preferable to use a modulation scheme and a guard band which is advantageous to a performance per UE. For example, for a specific UE, it may be preferable to use a filter which may decrease self-interference amount and adjust a size of guard band if entire performance is improved by decreasing a guard band and using a high order-modulation scheme. In this case, for the specific UE, it will be assumed that a transmission efficiency which may be acquired by decreasing the guard band is greater than that a transmission efficiency which may be acquired using the high order-modulation scheme.

Aspects of the present disclosure are to address at least the above-mentioned problems and/or disadvantages and to provide at least the advantages described below. Accordingly, an aspect of the present disclosure is to provide an apparatus and method for operating a resource in a multi-carrier system.

Another aspect of the present disclosure is to provide an apparatus and method for operating a resource based on self-interference amount and a spectrum confinement characteristic in a multi-carrier system.

Another aspect of the present disclosure is to provide an apparatus and method for operating a resource thereby increasing symbol transmission efficiency in a wireless communication system supporting a filter bank multi carrier (FBMC) scheme. Hereinafter, a wireless communication system supporting an FBMC scheme will be referred to as FBMC system.

Another aspect of the present disclosure is to provide an apparatus and method for transmitting information related to a resource block (RB) type determined based on a characteristic of a UE in a base station (BS) in a multi-carrier system.

Another aspect of the present disclosure is to provide an apparatus and method for transmitting a signal to a BS based on information related to an RB type received from the BS in a UE in a multi-carrier system.

In accordance with various embodiments of the present disclosure, a method for operating a resource in a BS in a wireless communication system supporting multi-carrier communication is provided. The method includes acquiring reference information related to at least one RB to be allocated to a UE, determining an RB type to be used in the at least one RB based on the reference information, and transmitting, to the UE, information related to the RB type to be used in the at least one RB.

In accordance with various embodiments of the present disclosure, a method for operating a resource in a UE in a wireless communication system supporting multi-carrier communication is provided. The method includes transmitting, to a BS, state information to be used as reference information related to at least one RB to be allocated to the UE and receiving information related to an RB type to be used in the at least one RB from the BS, wherein the RB type is determined based on the reference information in the BS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
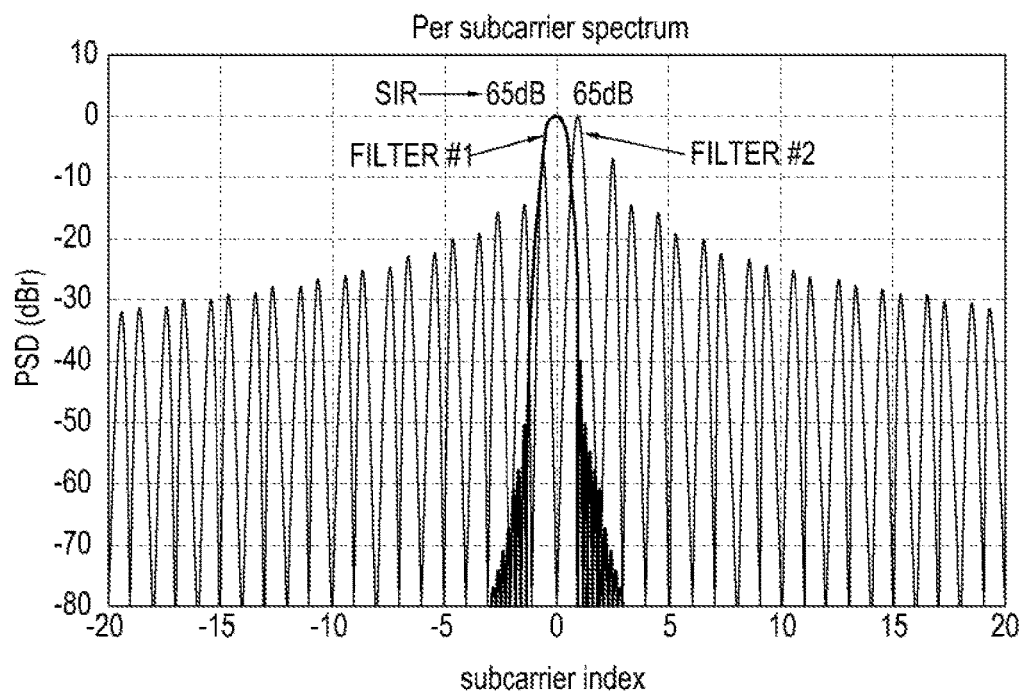
FIGS. 1A and 1B schematically illustrate a change in a characteristic according to a filter used in a multi-carrier device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (mp3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital video disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, each of a transmitting apparatus and a receiving apparatus may be an electronic device.

According to various embodiments of the present disclosure, a transmitting apparatus may be a base station (BS) or a user equipment (UE).

According to various embodiments of the present disclosure, a receiving apparatus may be a UE or a BS.

According to various embodiments of the present disclosure, a transmitting/receiving apparatus may be a UE or a BS.

In various embodiments of the present disclosure, it will be noted that the term UE may be interchangeable with the term mobile station (MS), wireless terminal, mobile device, and/or the like.

In various embodiments of the present disclosure, it will be noted that the term BS may be interchangeable with the term enhanced node B (eNB), access point (AP), and/or the like.

An embodiment of the present disclosure provides an apparatus and method for operating a resource in a multi-carrier system. Here, the multi-carrier system denotes a wireless communication system supporting a multi-carrier scheme.

An embodiment of the present disclosure provides an apparatus and method for operating a resource based on self-interference amount and a spectrum confinement characteristic in a multi-carrier system.

An embodiment of the present disclosure provides an apparatus and method for operating a resource thereby increasing symbol transmission efficiency in a wireless communication system supporting a filter bank multi carrier (FBMC) scheme. Hereinafter, a wireless communication system supporting an FBMC scheme will be referred to as FBMC system.

An embodiment of the present disclosure provides an apparatus and method for transmitting information related to a resource block (RB) type determined based on a characteristic of a UE in a BS in a multi-carrier system.

An embodiment of the present disclosure provides an apparatus and method for transmitting a signal to a BS based on information related to an RB type received from the BS in a UE in a multi-carrier system.

An apparatus and method proposed in various embodiments of the present disclosure may be applied to various communication systems such as a digital video broadcasting system such as a mobile broadcasting service such as a digital multimedia broadcasting (DMB) service, a digital video broadcasting-handheld (DVP-H) service, an advanced television systems committee-mobile/handheld (ATSC-M/H) service, and the like, and an internet protocol TV (IPTV) service, an MPEG media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a 3rd generation partnership project 2 (3GPP2), a wideband code division multiple access (WCDMA) mobile communication system proposed in the 3GPP2, a CDMA mobile communication system proposed in the 3GPP2, an institute of electrical and electronics engineers (IEEE) mobile communication system, a mobile IP system, and/or the like.

The present disclosure proposes various embodiments related to a scheme that a BS determines information related to an RB type for a UE based on reference information, e.g., resource allocation reference information, and transmits the determined information related to the RB type to the UE in a wireless communication system supporting multi-carrier such as FBMC, and/or the like.

The resource allocation reference information may include terminal state information, adjacent RB information, frequency selectivity of a channel, and/or the like.

The terminal state information may include a type of a filter, channel quality information (CQI), and/or the like. The terminal state information may be provided by a UE. The BS may receive terminal state information from each of UEs. The type of the filter is information for identifying at least one filter usable in a UE, and the CQI may be used for predicting a state of a received channel of a UE. Each of the at least one filter usable in the UE has a self-signal-to-interference ratio (self-SIR) and a spectrum confinement characteristic as an example of defining self-interference amount. If the UE is able to use a plurality of filters, each of the plurality of filters has a unique self-SIR and spectrum confinement characteristic.

The adjacent RB information may include information related to adjacent channel leakage requirement in at least one adjacent RB and an RB type used in the at least one adjacent RB, and/or the like. The adjacent RB may include at least one of an adjacent RB which is located at the left of a target RB and an adjacent RB which is located at the right of the target RB. Here, an adjacent RB which is located at the left of a target RB will be referred to as left adjacent RB, and an adjacent RB which is located at the right of a target RB will be referred to as right adjacent RB. The target RB denotes an RB of which information related to an RB type will be determined. For example, if the target RB is the leftmost RB of a plurality of RBs included in a transmission bandwidth, there will be only right adjacent RBs for the target RB. For another example, if the target RB is the rightmost RB of a plurality of RBs included in a transmission bandwidth, there will be only left adjacent RBs for the target RB. For each of the remaining RBs among the plurality of RBs included in the transmission bandwidth, there will be a right adjacent RB and a left adjacent RB.

According to an embodiment of the present disclosure, if a leakage level to an adjacent RB which is required as an adjacent channel leakage requirement is low, a BS may determine an RB type for increasing the number of nullings for a target RB, and using a filter a good confinement characteristic and a physical mapping rule of the filter.

According to an embodiment of the present disclosure, a BS may determine an RB type which a UE will use in a target RB based on a type of a filter used in an adjacent RB, a nulling number, and/or the like. Here, "nulling number" denotes the number of nullings.

According to an embodiment of the present disclosure, a BS may determine an RB type thereby a UE may use a filter which is robust for channel estimation according to frequency selectivity.

The information related to the RB type may set a type of at least one filter to be used in a target RB, a physical mapping rule of the at least one filter, and/or the like. The type of the at least one filter may be set by an index of the at least one filter. The physical mapping rule of the at least one filter is information defining an operating order for operating at least one filter which is allowed to use by an index of a filter.

The information related to the RB type may further include information related a nulling number for a target RB. The nulling number may include at least one of a left nulling number and a right nulling number. Here, a left nulling number denotes the number of left nullings, and a right nulling number denotes the number of right nullings. For example, a BS may determine a left nulling number and a right nulling number based on information related to adjacent channel leakage requirement and an RB type included in adjacent RB information.

The present disclosure will propose various embodiments for a scheme in which a UE, in a wireless communication system supporting multi-carrier such as FBMC, and/or the like, acquires information related to at least one filter to be used in one or more RBs which is allowed to use in the UE, a physical mapping rule of the at least one filter, and a left nulling number and a right nulling number for each of the one or more RBs based on information related to an RB type received from a BS, and transmits a signal to the BS in each of the one or more RBs which is allowed to use in the UE based on the acquired information related to the at least one filter to be used in the one or more RBs which is allowed to use in the UE, the physical mapping rule of the at least one filter, and the left nulling number and the right nulling number for each of the one or more RBs.

According to an embodiment of the present disclosure, a UE may transmit terminal state information including types of filters usable in the UE, CQI, and/or the like to a BS.

According to an embodiment of the present disclosure, a UE may use a table for acquiring at least one filter to be used in each of one or more RBs which is allowed to use in the UE, a physical mapping rule of the at least one filter, and a left nulling number and a right nulling number for each of the one or more RBs based on information related to an RB type received from a BS. In this case, the UE may include a table which defines at least one filter to be used corresponding to each of supportable RB types and a physical mapping rule of the at least one filter. The table included in the UE may further define a left nulling number and a right nulling number corresponding to each of supportable RB types.

According to an embodiment of the present disclosure, in a case that a UE is allowed to use a plurality of RBs, a nulling number may be set to the first RB and the last RB in a frequency axis among at least two continuous RBs for which the same RB type is determined among the plurality of RBs. For example, a left nulling number may be set to the first RB, and a right nulling number may be set to the last RB.

Various embodiments proposed in the present disclosure will be described with reference to the following figures.

A change in a characteristic according to a filter used in a wireless communication device supporting multi-carrier will be described with reference to FIGS. 1A and 1B. Hereinafter, a wireless communication device supporting multi-carrier will be referred to as multi-carrier device.

Figure 1B:
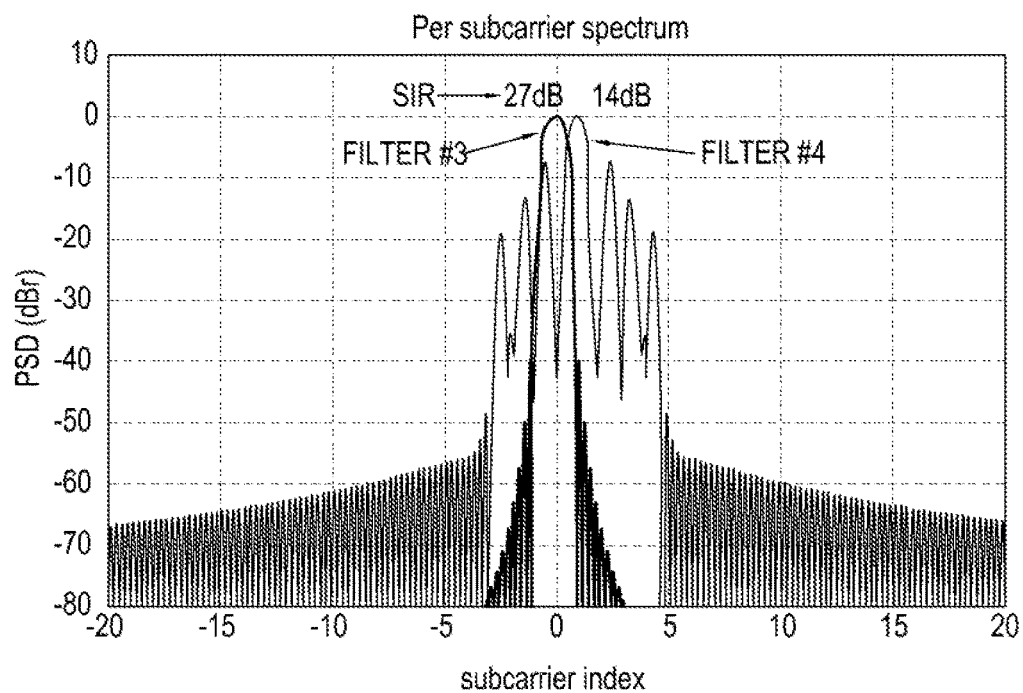

FIGS. 1A and 1B schematically illustrate a change in a characteristic according to a filter used in a multi-carrier device according to an embodiment of the present disclosure. Here, the multi-carrier device may be a BS which provides a wireless communication service to a plurality of UEs located at a predetermined service area based on a preset communication scheme which is based on multi-carrier.

Referring to FIG. 1A, it will be assumed that a multi-carrier device is a multi-carrier device using a filter set including the first filter FILTER #1 and the second filter FILTER #2. For example, the first filter FILTER #1 may be a physical layer for dynamic spectrum access and cognitive radio (PHYDYAS) filter.

It will be understood that the first and second filters included in the filter set are filters of which self-interference amount is very small, that is, the self-interference amount is less than preset threshold amount, thereby a value of a self-SIR that is 65 dB and a spectrum confinement may not be good or adequate.

Referring to FIG. 1B, it will be assumed that a multi-carrier device is a multi-carrier device using a filter set including the third filter FILTER #3 and the fourth filter FILTER #4. For example, the third filter FILTER #3 may be a PHYDYAS filter.

It will be understood that values of self-SIRs of the third and fourth filters included in the filter set are 27 dB and 14 dB, respectively. That is, it will be understood that the filter set has relatively high self-interference amount and a relatively good characteristic in spectrum confinement compared to the filter set assumed in FIG. 1A.

As described above, it will be understood that self-interference amount and a spectrum confinement characteristic may be varied according to a combination of filters used in a multi-carrier device. So, an RB needs to be configured thereby being appropriate for a specific user, so a scheme for this needs to be provided.

For example, an RB type may be determined based on various parameters such as a filter index, a physical mapping rule of a filter, a left nulling number, a right nulling number, and/or the like. The filter index may be information for identifying at least one filter used for a filter combination. The physical mapping rule of the at least one filter may be information defining an operating order (or driving order) of at least one filter included in a filter combination. The left nulling number and the right nulling number may be information defining an empty space in a start frequency area (left frequency area) and an empty space in an end frequency area (right frequency area) in an allocated frequency band.

As an example, in FIGS. 1A and 1B, a filter combination includes a plurality of filters. However, a filter combination may include one filter.

A change in a characteristic according to a filter used in a multi-carrier device has been described with reference to FIGS. 1A and 1B, and an example of a process of transmitting and receiving a signal between a BS and a UE in a multi-carrier system according to an embodiment of the present disclosure will be described with reference to FIG. 2.

Figure 2:
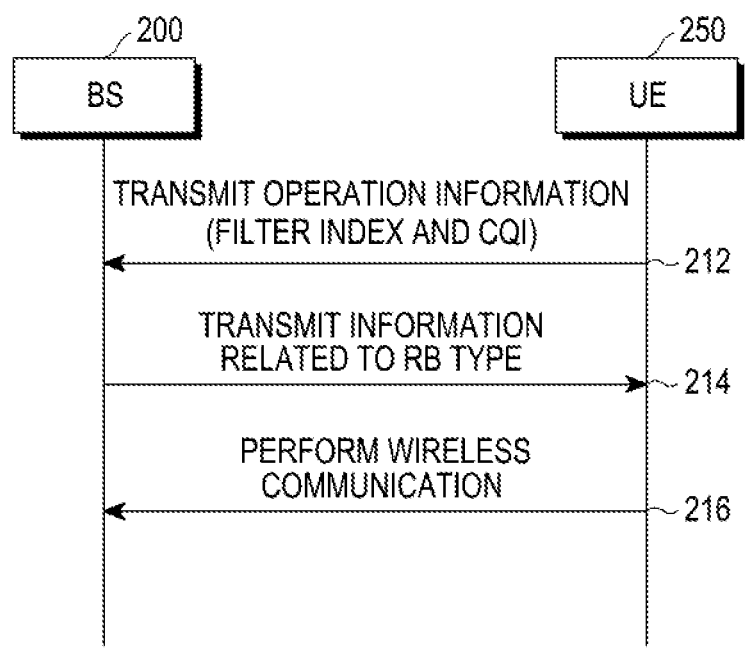
FIG. 2 schematically illustrates an example of a process of transmitting and receiving a signal between a base station (BS) and a user equipment (UE) in a multi-carrier system according to an embodiment of the present disclosure.

FIG. 2 schematically illustrates an example of a process of transmitting and receiving a signal between a BS and a UE in a multi-carrier system according to an embodiment of the present disclosure.

Referring to FIG. 2, a UE 250 may provide operation information supportable for wireless communication to a BS 200 at operation 212. The operation information may include information related to a hardware or software to be used for the wireless communication in the UE 250. Further, the operation information may include various information related to supportable wireless communication performance, and/or the like. It may be preferable that the operation information includes information necessary for determining an RB type of the UE 250. In this case, the operation information may include a filter index operable in the UE 250, a channel quality index (CQI), and/or the like.

The BS 200 receives operation information from a plurality of UEs including the UE 250 and may determine an RB type per UE based on the received operation information. For example, the BS 200 may analyze an RB type allocated to a UE which uses a radio resource (i.e., a left radio resource) which is located at the left of a radio resource (e.g., a frequency band, and/or the like) which has been allocated to the UE 250 or will be allocated to the UE 250 and a radio resource (i.e., a right radio resource) which is located at the right of a radio resource (e.g., a frequency band, and/or the like) which has been allocated to the UE 250 or will be allocated to the UE 250, adjacent channel leakage ratio (ACLR) requirement for each of the left radio resource and the right radio resource, channel quality, and/or the like, and determine an RB type which the UE 250 will use based on the analyzed result.

According to an embodiment of the present disclosure, the BS 200 may determine an RB type of the UE 250 based on an RB type table. The RB type table may define a filter index, a physical mapping rule of a filter, a left nulling number, and a right nulling number which correspond to each of all RB types. The left nulling number may define a left empty space and the right nulling number may define a right empty space. All of the RB types may be specified by combinations of all filters supportable in a UE. A left nulling number and a right nulling number may be allocated for each of the filter combinations.

Table 1 shows an example of an RB type table.

TABLE 1

| RB Type | filter index & physical mapping rule | nulling number | |
|---|---|---|---|
| | | left | right |
| 1 | M1_(filter index order #1) | n1 | m1 |
| 2 | M2_(filter index order #1) | n2 | m2 |
| 3 | M3_(filter index order #1) | n3 | m3 |
| 4 | M4_(filter index order #1) | n4 | m4 |
| 5 | M5_(filter index order #1) | n5 | m5 |
| ... | ... | ... | ... |

In Table 1, each of n1, n2, n3, n4, n5 . . . indicates a left nulling number defined per RB type, and each of m1, m2, m3, mn4, m5 . . . indicates a right nulling number defined per RB type.

An RB type table as expressed in Table 1 defines a type of a filter to be used per RB type, an operating order of the filter "M1_(filter index order #1)", an empty space between an RB and a frequency band which is adjacent to the left of the RB, i.e., a left empty space (i.e., a left nulling number), and an empty space between the RB and a frequency band which is adjacent to the right of the RB, i.e., a right empty space (i.e., a right nulling number). Here, an empty space may correspond to a nulling number.

For example, if an RB type is "1", M1_(filter index order #1) may be set to "(1, 2)". In the "(1, 2)", "1" and "2" are filter indexes for designating filters to be used, and indicate the first filter and the second filter. In the "(1, 2)", "2" after "1" indicates that the second filter operates after the first filter operates.

The BS 200 provides (or transmits) information related to an RB type determined for the UE 250 (hereinafter, "RB type information") to the UE 250 at operation 214. The RB type information needs to be defined thereby the UE 250 may recognize an RB type to be used in the UE 250. For example, the RB type information may include an identifier indicating an RB type. In this case, the number of bits included in the identifier may be determined based on the number of RB types usable by a UE. That is, if the number of RB types usable by the UE is twenty (20), the number of bits included in the identifier may be five (5).

A scheme of providing the RB type information to a UE is not limited to a specific channel, a specific message, time at which the RB type information is provided, and/or the like. For example, an RB type determined by the BS 200 may be provided to each UE through a dedicated control channel, and/or the like, or may be commonly provided to a plurality of UEs through a common control channel, and/or the like. The BS 200 may provide an RB type determined per UE at designated time or arbitrary time.

The UE 250 identifies an RB type which is allowed for the UE 250 to use based on RB type information received from the BS 200, and performs a wireless communication with the BS 200 based on elements defined for the identified RB type at operation 216. For example, the elements defined for the RB type may include a filter index, a physical mapping rule of a filter, a left nulling number, and a right nulling number.

The UE 250 may use an RB type table for acquiring elements to be used for a wireless communication in the UE 250 based on the RB type information. The RB type table may be identical to an RB type table used for determining an RB type in the BS 200.

An example of a process of transmitting and receiving a signal between a BS and a UE in a multi-carrier system according to an embodiment of the present disclosure has been described with reference to FIG. 2, and an example of a process of configuring an RB type in a multi-carrier system according to an embodiment of the present disclosure will be described with reference to FIG. 3.

Figure 3:
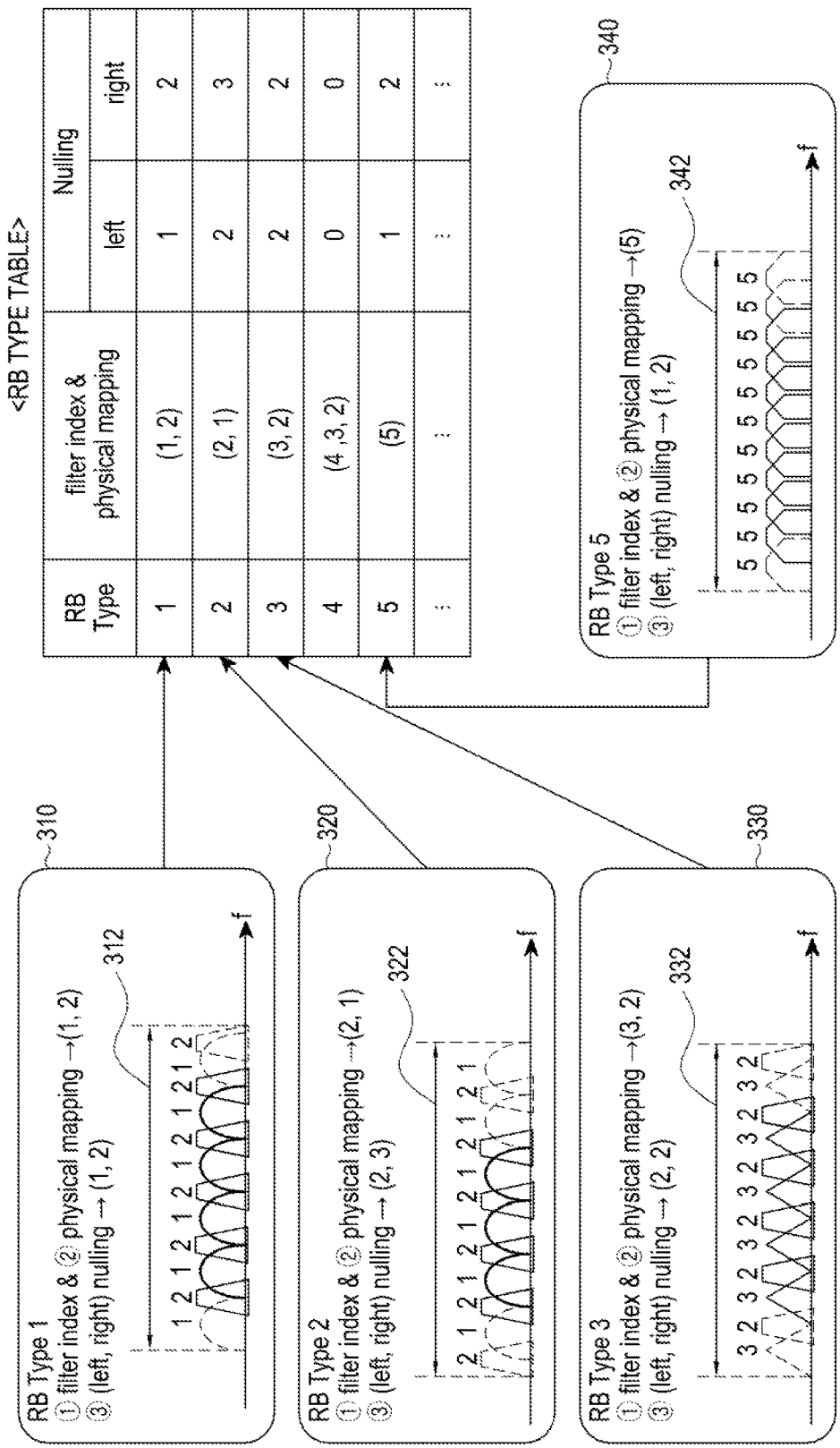
FIG. 3 schematically illustrates an example of a process of configuring a resource block (RB) type in a multi-carrier system according to an embodiment of the present disclosure.

FIG. 3 schematically illustrates an example of a process of configuring an RB type in a multi-carrier system according to an embodiment of the present disclosure.

Referring to FIG. 3, an RB type may be determined based on a filter index, a physical mapping rule of a filter, a left nulling number, and a right nulling number. That is, when an RB type is selected, a filter index, a physical mapping rule of a filter, a left nulling number, and a right nulling number may be determined corresponding to the selected RB type. In an embodiment of the present disclosure, an RB type table may be configured in advance. The RB type table defines a filter index, a physical mapping rule of a filter, a left nulling number, and a right nulling number per RB type.

Table 2 shows an example of an RB type table.

TABLE 2

| RB Type | filter index & physical mapping rule | nulling number left | right |
|---|---|---|---|
| 1 | (1, 2) | 1 | 2 |
| 2 | (2, 1) | 2 | 3 |
| 3 | (3, 2) | 2 | 2 |
| 4 | (4, 3, 2) | 0 | 0 |
| 5 | (5) | 1 | 2 |
| ... | ... | ... | ... |

In Table 2, a combination of a filter index and a physical mapping rule of a filter (hereinafter, "filter index & physical mapping rule") designates at least one filter to be used, and defines an operating order of the designated at least one filter per RB type.

This will be described below. The first example (310) corresponds to a case that an RB type #1 is selected. In this case, "filter index & physical mapping rule", "left nulling number", and "right nulling number" which are set corresponding to the RB type 1 may be acquired from an RB type table. For example, the acquired "filter index & physical mapping rule" will be "(1, 2)", the acquired "left nulling number" will be "1", and the acquired "right nulling number" will be "2".

The "(1, 2)" acquired as the "filter index & physical mapping rule" may be analyzed to use the first filter and the second filter and to instruct a filtering operation according to an order of the first filter and the second filter. The "1" acquired as the "left nulling number" may be analyzed to instruct to use one sub-band as an empty space before the first filtering operation is performed in an RB 312. The "2" acquired as the "right nulling number" may be analyzed to instruct to use two sub-bands as an empty space after the last filtering operation is performed in the RB 312.

So, when an RB type #1 is selected, in an RB 312, a multi-carrier device will not perform a filtering operation by the first filter in the first sub-band, will perform a filtering operation by the second filter in the second sub-band, and will perform a filtering operation by the first filter in the third sub-band. Thereafter, the multi-carrier device will alternately perform a filtering operation by the second filter and a filtering operation by the first filter from the fourth sub-band to the tenth sub-band. The multi-carrier device does not perform a filtering operation by the first filter and the second filter in the remaining two sub-bands (e.g., the eleventh sub-band and the twelfth sub-band) which correspond to a right empty space after performing a filtering operation by the second filter in the tenth sub-band.

The second example (320) corresponds to a case that an RB type #2 is selected. In this case, "filter index & physical mapping rule", "left nulling number", and "right nulling number" which are set corresponding to the RB type 2 may be acquired from an RB type table. For example, the acquired "filter index & physical mapping rule" will be "(2, 1)", the acquired "left nulling number" will be "2", and the acquired "right nulling number" will be "3".

The "(2, 1)" acquired as the "filter index & physical mapping rule" may be analyzed to use the first filter and the second filter and to instruct a filtering operation according to an order of the second filter and the first filter. The "2" acquired as the "left nulling number" may be analyzed to instruct to use two sub-bands as an empty space before the first filtering operation is performed in an RB 322. The "3" acquired as the "right nulling number" may be analyzed to instruct to use three sub-bands as an empty space after the last filtering operation is performed in the RB 322.

So, when an RB type #2 is selected, in an RB 322, a multi-carrier device will not perform a filtering operation by the second filter in the first sub-band and a filtering operation by the first filter in the second sub-band, will perform a filtering operation by the second filter in the third sub-band, and will perform a filtering operation by the first filter in the fourth sub-band. Thereafter, the multi-carrier device will alternately perform a filtering operation by the second filter and a filtering operation by the first filter from the fifth sub-band to the ninth sub-band. The multi-carrier device does not perform a filtering operation by the first filter, the second filter, and the first filter in the remaining three sub-bands (e.g., the tenth sub-band, the eleventh sub-band, and the twelfth sub-band) which correspond to a right empty space after performing a filtering operation by the second filter in the ninth sub-band.

The third example (330) corresponds to a case that an RB type #3 is selected. In this case, "filter index & physical mapping rule", "left nulling number", and "right nulling number" which are set corresponding to the RB type 3 may be acquired from an RB type table. For example, the acquired "filter index & physical mapping rule" will be "(3, 2)", the acquired "left nulling number" will be "2", and the acquired "right nulling number" will be "2".

The "(3, 2)" acquired as the "filter index & physical mapping rule" may be analyzed to use the second filter and the third filter and to instruct a filtering operation according to an order of the third filter and the second filter. The "2" acquired as the "left nulling number" may be analyzed to instruct to use two sub-bands as an empty space before the first filtering operation is performed in an RB 332. The "2" acquired as the "right nulling number" may be analyzed to instruct to use two sub-bands as an empty space after the last filtering operation is performed in the RB 332.

So, when an RB type #3 is selected, in an RB 332, a multi-carrier device will not perform a filtering operation by the third filter in the first sub-band and a filtering operation by the second filter in the second sub-band, will perform a filtering operation by the third filter in the third sub-band, and will perform a filtering operation by the second filter in the fourth sub-band. Thereafter, the multi-carrier device will alternately perform a filtering operation by the third filter and a filtering operation by the second filter from the fifth sub-band to the tenth sub-band. The multi-carrier device does not perform a filtering operation by the third filter and the second filter in the remaining two sub-bands (e.g., the eleventh sub-band and the twelfth sub-band) which correspond to a right empty space after performing a filtering operation by the second filter in the tenth sub-band.

The fourth example corresponds to a case that an RB type #4 is selected. In this case, "filter index & physical mapping rule", "left nulling number", and "right nulling number" which are set corresponding to the RB type 4 may be acquired from an RB type table. For example, the acquired "filter index & physical mapping rule" will be "(4, 3, 2)", the acquired "left nulling number" will be "0", and the acquired "right nulling number" will be "0".

In this case, there are no left empty space and right empty space, so a multi-carrier device will repetitively perform a filtering operation in all sub-bands included in an RB based on an order of the fourth filter, the third filter, and the second filter.

The fifth example (340) corresponds to a case that an RB type #5 is selected. In this case, "filter index & physical mapping rule", "left nulling number", and "right nulling number" which are set corresponding to the RB type 5 may be acquired from an RB type table. For example, the acquired "filter index & physical mapping rule" will be "(5)", the acquired "left nulling number" will be "1", and the acquired "right nulling number" will be "2".

The "(5)" acquired as the "filter index & physical mapping rule" may be analyzed to instruct a filtering operation by one filter (the fifth filter). The "1" acquired as the "left nulling number" may be analyzed to instruct to use one sub-band as an empty space before the first filtering operation is performed in an RB 342. The "1" acquired as the "right nulling number" may be analyzed to instruct to use two sub-bands as an empty space after the last filtering operation is performed in the RB 342.

So, when an RB type #5 is selected, in an RB 342, a multi-carrier device will not perform a filtering operation by the fifth filter in the first sub-band, will perform a filtering operation by the fifth filter in the second sub-band to the tenth sub-band, and will not perform a filtering operation by the fifth filter in the remaining two sub-bands (the eleventh sub-band and the twelfth sub-band) which correspond to a right empty space.

In the operation described above, a frequency band filtered by one filter will be referred to as "sub-band". The sub-band may be defined by one or more sub-carriers. A sub-carrier may be defined as one element for configuring multi-carrier. For example, it will be assumed that a frequency band (312, 322, 332, and 342) allocated in FIG. 3 includes 12 sub-bands.

In a case that an RB type #1 is selected and a case that an RB type #2 is selected, if physical mapping orders, i.e., operating orders, of filters to be used (the first filter and the second filter) are different even though filters to be used (the first filter and the second filter) are the same, these may be classified as different RB types. Out-of-band leakage requirement for a current RB may be varied according that which system or which RB is deployed at the left and the right of the current RB. This is why out-of-band radiation amount may be varied according to filters which are deployed at a left end and a right end.

Further, a reason why space is made at the left and the right in an RB is to adjust amount of interference among RBs which occurs since RBs operate different filter sets. That is, it is possible to adjust interference among RBs by adjusting a size of an empty space which exists at the left and a size of an empty space which exists at the right. For example, a size of an empty space is a nulling value, e.g., the number of nulling s.

An example of a process of configuring an RB type in a multi-carrier system according to an embodiment of the present disclosure has been described with reference to FIG. 3, and an example of a process of allocating an RB type to a UE in a BS in a multi-carrier system according to an embodiment of the present disclosure will be described with reference to FIG. 4.

Figure 4:
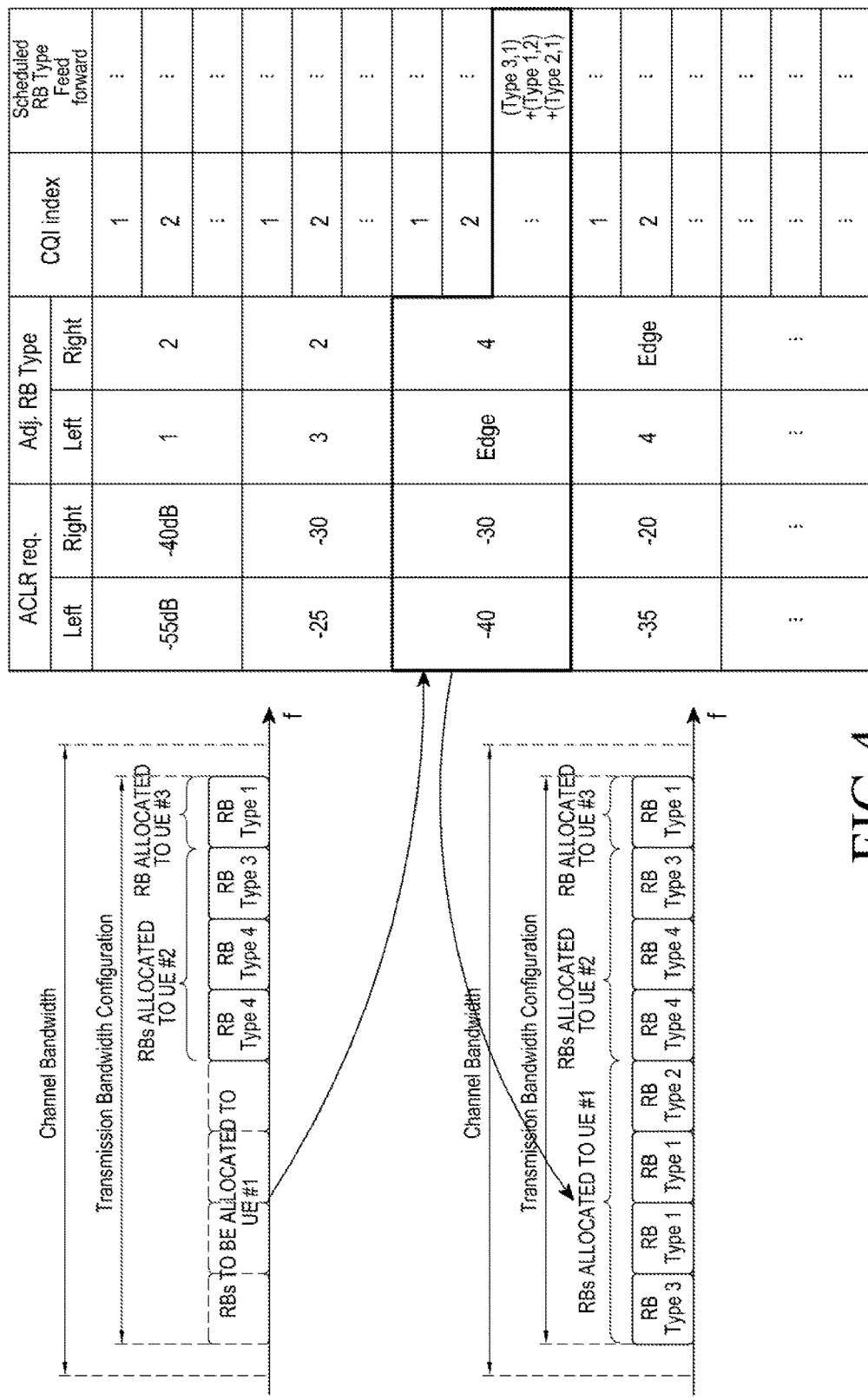
FIG. 4 schematically illustrates an example of a process of allocating an RB type to a UE in a BS in a multi-carrier system according to an embodiment of the present disclosure.

FIG. 4 schematically illustrates an example of a process of allocating an RB type to a UE in a BS in a multi-carrier system according to an embodiment of the present disclosure.

Referring to FIG. 4, a channel bandwidth may include a transmission bandwidth. The transmission bandwidth may be configured by a preset RB as a unit for resource allocation. The transmission bandwidth may be divided into a plurality of RBs. In this case, a BS may allocate one or more RBs per UE. For example, in FIG. 4, a BS will allow a UE #1 to use a frequency band which corresponds to four RBs after allowing a UE #2 to use a frequency band which corresponds to three RBs, and allowing a UE #3 to use a frequency band which corresponds to one RB. That is, in FIG. 4, it will be assumed that the BS will allocate four RBs to the UE #1.

In FIG. 4, it will be assumed that "RB Type 4", "RB Type 4", and "RB Type 3" are determined for the three RBs allocated to the UE #2, respectively, and "RB Type 1" is determined for the one RB allocated to the UE #3.

The BS needs to determine an RB type for each of the four RBs which the BS will allocate to the UE #1 and to provide information about the RB type which is determined for each of the four RBs to the UE #1.

The BS may determine an RB type for each of four RBs to be allocated to a target UE (e.g., UE #1) based on service association information (resource allocation reference information) for the target UE such as information about a left RB, information about a right RB, channel quality, and/or the like. Here, the left RB and the right RB are determined based on a current RB (e.g., a target RB) of which an RB type will be determined among the four RBs to be allocated to the target UE.

For example, the information about the left RB may include ACLR requirement (left ACLR), an RB type (left Adj. RB Type), and/or the like of the left RB which is located at the left of a current RB in a frequency axis, and the information about the right RB may include ACLR requirement (right ACLR), an RB type (right Adj. RB Type), and/or the like of the right RB which is located at the right of the current RB in the frequency axis.

So, it will be understood that RB types of the four RBs to be allocated to the target UE (the UE #1) are determined as "RB Type 3", "RB Type 1", "RB Type 1", and "RB Type 2", respectively.

An example of a process of allocating an RB type to a UE in a BS in a multi-carrier system according to an embodiment of the present disclosure has been described with reference to FIG. 4, and an example of a process of operating an empty space in a case that a BS allocates an RB block type in a multi-carrier system according to an embodiment of the present disclosure will be described with reference to FIG. 5.

Figure 5:
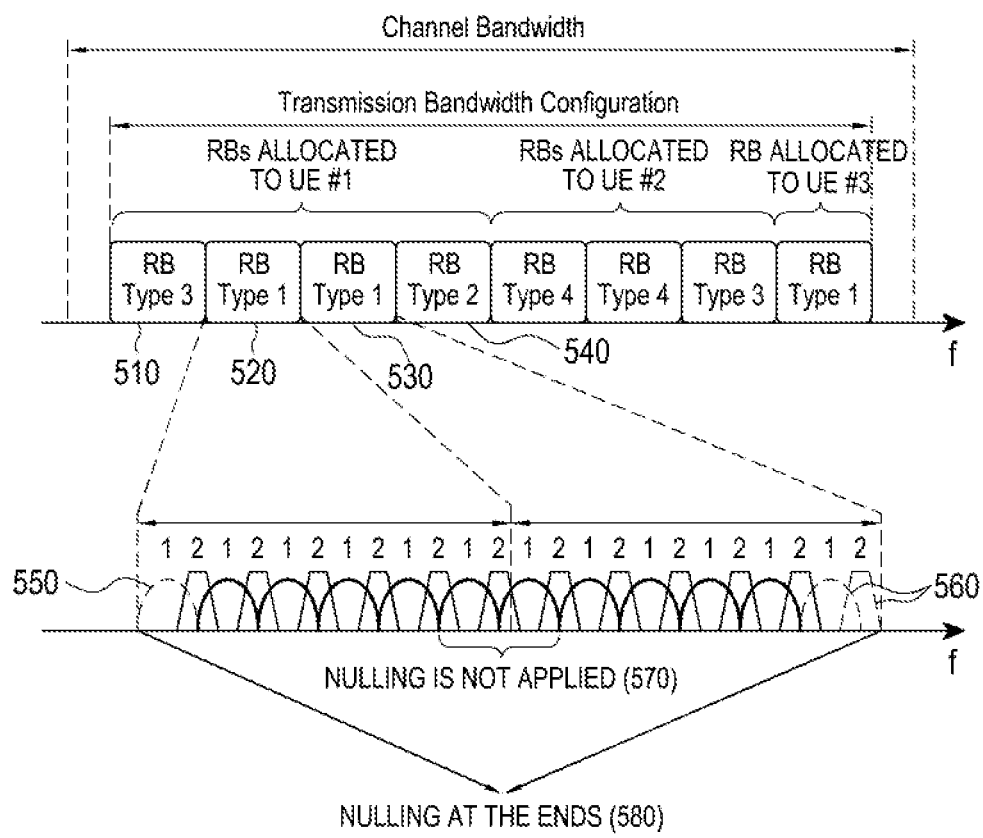
FIG. 5 schematically illustrates an example of a process of operating an empty space in a case that a BS allocates an RB block type in a multi-carrier system according to an embodiment of the present disclosure.

FIG. 5 schematically illustrates an example of a process of operating an empty space in a case that a BS allocates an RB block type in a multi-carrier system according to an embodiment of the present disclosure.

Referring to FIG. 5, a BS may allocate one or more RBs to one UE as a radio resource. The BS may determine an RB type per RB allocated to the one UE. If the plurality of RBs are allocated to the one UE, the BS needs to determine an RB type for each of the allocated RBs. At this time, there may be at least two continuous RBs for which the same RB type is determined among the plurality of RBs.

In this case, the BS does not need to allocate empty spaces for all of the allocated RBs. That is, the BS will not allocate empty spaces for the remaining RBs (RBs located at the center) except for RBs located at the ends among the at least two continuous RBs for which the same RB type is determined. The BS will not allocate an empty space for one of the front and the back in each of the RBs (i.e., the first RB and the last RB) located at the ends among the at least two continuous RBs for which the same RB type is determined. The BS may allocate an empty space to the front of the first RB and the back of the last RB among the at least two continuous RBs for which the same RB type is determined. That the BS allocates the empty space to the front of the first RB and the back of the last RB is for separating the at least two continuous RBs for which the same RB type is determined from an RB for which a different RB type is determined. This may decrease an effect due to a spectrum confinement characteristic. Meanwhile, the allocation of the empty space may mean designation of the number of nullings.

Generally, allocation of an empty space among RBs is for adjusting interference among the RBs, so there is no need for performing a nulling operation for continuous RBs to which the same RB type is allocated.

According to an embodiment of the present disclosure, it will be assumed that a BS allocates four RBs 510 to 540 to UE #1. The BS determines "RB Type 3", "RB Type 1", "RB Type 1", and "RB Type 2" for the four RBs 510 to 540 allocated to the UE #1, respectively. According to the determined result, it will be understood that the BS determines the same RB type (e.g., RB type 1) for two center RBs 520 and 530 among the allocated four RBs 510, 520, 530, and 540.

The BS designates one filtering band 550 which is located at the front among twelve (12) filtering bands included in the first RB 520 among the two center RBs 520 and 530 for which the same RB type is determined as an empty space (a nulling number: 1). The BS designates two filtering bands 560 which are located at the back among 12 filtering bands included in the second RB 530 among the two center RBs 520 and 530 as an empty space (a nulling number: 2). Here, a filtering band may be a frequency band for which filtering is performed by one filter. Nulling may not be applied at position 570 (the back filters of RB 520 and the front filters of RB 530), as illustrated in FIG. 5. Nulling may be applied at the first filter of RB 520 and the last filter of RB 530, as illustrated in FIG. 5.

An example of a process of operating an empty space in a case that a BS allocates an RB block type in a multi-carrier system according to an embodiment of the present disclosure has been described with reference to FIG. 5, and another example of a process of transmitting and receiving a signal between a BS and a UE in a multi-carrier system according to an embodiment of the present disclosure will be described with reference to FIG. 6.

Figure 6:
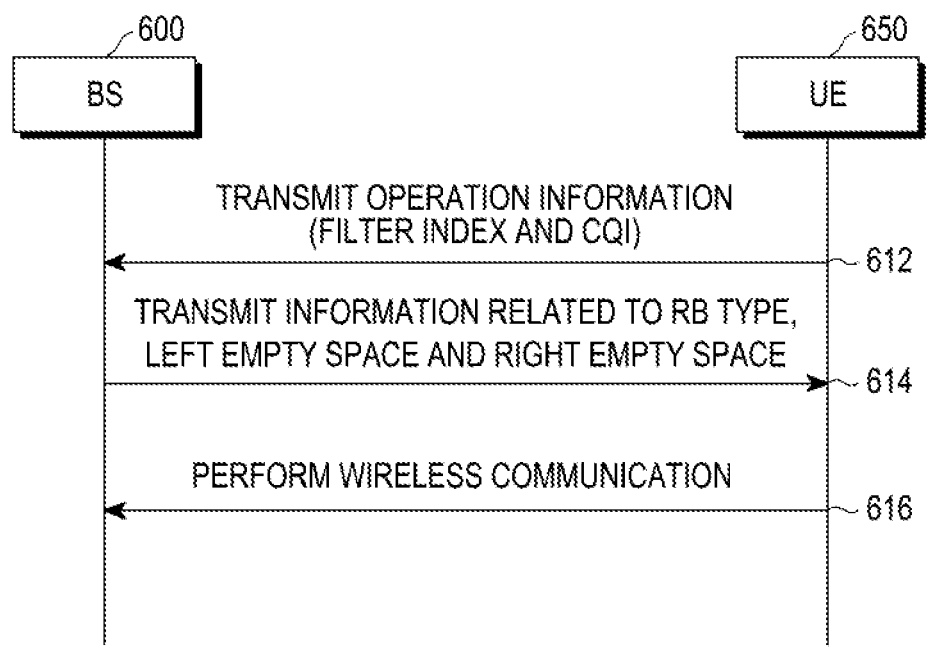
FIG. 6 schematically illustrates another example of a process of transmitting and receiving a signal between a BS and a UE in a multi-carrier system according to an embodiment of the present disclosure.

FIG. 6 schematically illustrates another example of a process of transmitting and receiving a signal between a BS and a UE in a multi-carrier system according to an embodiment of the present disclosure.

Referring to FIG. 6, a procedure in which a BS 600 determines an RB type for a UE 650, and provides the determined RB type to the UE 650 and a procedure in which the UE 650 performs a wireless communication based on the information provided from the BS 600 may be similar to procedures in FIG. 2. Further referring to FIG. 6, the UE 650 may provide operation information supportable for wireless communication to a BS 200 at operation 612. The UE 650 identifies an RB type which is allowed for the UE 650 and performs a wireless communication with the BS 600 based on elements defined for the identified RB type at operation 616.

That is, a procedure in FIG. 6 will be identical to a procedure in FIG. 2 except for a procedure (operation 614) in which a BS 600 determines a left empty space and a right empty space in an RB and provides information about the determined left empty space and right empty space as well as an RB type to the UE 650, and a procedure in which the UE 650 acquires a left empty space and a right empty space in an RB from the information provided from the BS 600, not an RB type. That is, RB type information provided from the BS 600 to the UE 650 may further include "nulling number" which corresponds to a left empty space and a right empty space as well as an RB type for a specific RB (operation 614).

In an embodiment of the present disclosure, the BS 600 uses an RB type table which defines "filter index & physical mapping rule", "left nulling number", and "right nulling number" which correspond to an RB type as shown in Table 1. This is why the BS 600 needs to acquire "nulling number" to be provided in the UE 650. However, the UE 650 does not need to include an RB type table with a format identical to an RB type table shown in Table 1. This is why "left nulling number" and "right nulling number" which the UE 650 requires are provided from the BS 600.

Table 3 shows an example of an RB type table which may be defined for a UE.

TABLE 3

| RB Type | filter index & physical mapping rule |
|---|---|
| 1 | M1_(filter index order #1) |
| 2 | M2_(filter index order #1) |
| 3 | M3_(filter index order #1) |
| 4 | M4_(filter index order #1) |
| 5 | M5_(filter index order #1) |
| ... | ... |

An RB type table in Table 3 defines a type of a filter to be used and an operating order thereof "M1_(filter index order #1)". For example, M1_(filter index order #1) corresponding to an RB type "1" may be set to "(1,2)". In "(1,2)", "1" and "2" are filter indexes for identifying that filters to be used are the first filter and the second filter, and an order of "1" and "2" defines that the second filter operates after the first filter operates.

Another example of a process of transmitting and receiving a signal between a BS and a UE in a multi-carrier system according to an embodiment of the present disclosure has been described with reference to FIG. 6, and another example of a process of configuring an RB type in a multi-carrier system according to an embodiment of the present disclosure will be described with reference to FIG. 7.

Figure 7:
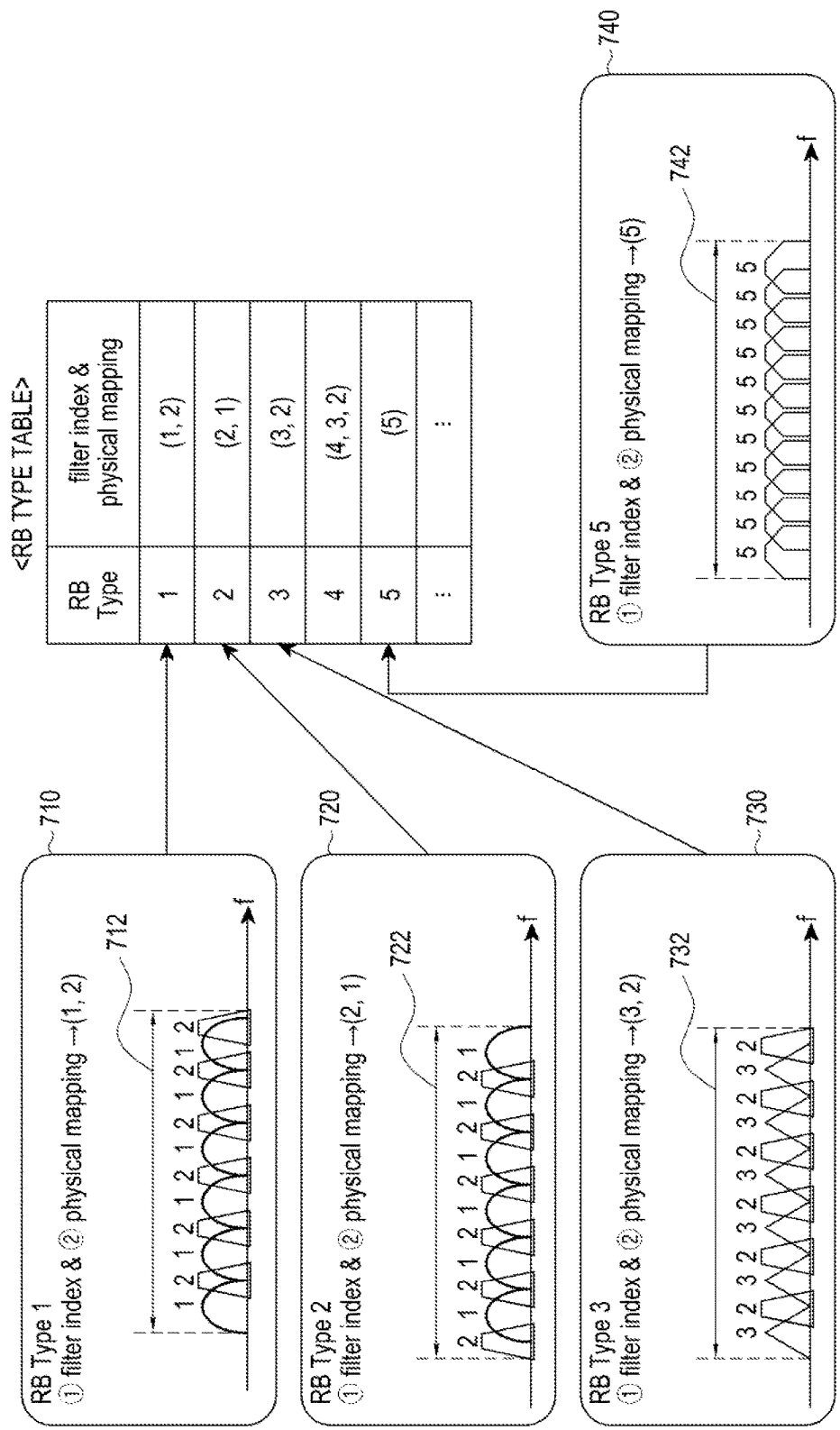
FIG. 7 schematically illustrates another example of a process of configuring an RB type in a multi-carrier system according to an embodiment of the present disclosure.

FIG. 7 schematically illustrates another example of a process of configuring an RB type in a multi-carrier system according to an embodiment of the present disclosure.

Referring to FIG. 7, an RB type may be determined based on a filter index and a physical mapping rule of a filter. That is, when an RB type is selected, a filter index and a physical mapping rule of a filter may be determined based on the selected RB type. In an embodiment of the present disclosure, an RB type table may be determined in advance. The RB type table defines a filter index and a physical mapping rule of a filter per RB type.

Table 4 shows an example of an RB type table.

TABLE 4

| RB Type | filter index & physical mapping rule |
|---|---|
| 1 | (1, 2) |
| 2 | (2, 1) |
| 3 | (3, 2) |
| 4 | (4, 3, 2) |
| 5 | (5) |
| ... | ... |

In Table 4, a combination of a filter index and a physical mapping rule of a filter (i.e., "filter index & physical mapping rule") designates at least one filter to be used, and defines an operating order of the designated at least one filter per RB type. A sub-band in the following description may be defined by a frequency bandwidth for which one filtering is performed.

This will be described below. The first example (710) corresponds to a case that an RB type #1 is selected. In this case, "filter index & physical mapping rule" which is set corresponding to the RB type #1 may be acquired from an RB type table. For example, the acquired "filter index & physical mapping rule" is "(1, 2)".

The "(1, 2)" acquired as the "filter index & physical mapping rule" may be analyzed to use the first filter and the second filter and to instruct a filtering operation according to an order of the first filter and the second filter.

So, when the RB type #1 is selected, a multi-carrier device will alternately perform a filtering operation by the first filter and a filtering operation by the second filter in each of 12 sub-bands included in an RB 712.

The second example (720) corresponds to a case that an RB type #2 is selected. In this case, "filter index & physical mapping rule" which is set corresponding to the RB type #2 may be acquired from an RB type table. For example, the acquired "filter index & physical mapping rule" is "(2, 1)".

The "(2, 1)" acquired as the "filter index & physical mapping rule" may be analyzed to use the first filter and the second filter and to instruct a filtering operation according to an order of the second filter and the first filter.

So, when the RB type #2 is selected, a multi-carrier device will alternately perform a filtering operation by the second filter and a filtering operation by the first filter in each of 12 sub-bands included in an RB 722.

The third example (730) corresponds to a case that an RB type #3 is selected. In this case, "filter index & physical mapping rule" which is set corresponding to the RB type #3 may be acquired from an RB type table. For example, the acquired "filter index & physical mapping rule" is "(3, 2)".

The "(3, 2)" acquired as the "filter index & physical mapping rule" may be analyzed to use the second filter and the third filter and to instruct a filtering operation according to an order of the third filter and the second filter.

So, when the RB type #3 is selected, a multi-carrier device will alternately perform a filtering operation by the third filter and a filtering operation by the second filter in each of 12 sub-bands included in an RB 732.

The fourth example (740) corresponds to a case that an RB type #5 is selected. In this case, "filter index & physical mapping rule" which is set corresponding to the RB type #5 may be acquired from an RB type table. For example, the acquired "filter index & physical mapping rule" is "(5)".

The "(5)" acquired as the "filter index & physical mapping rule" may be analyzed to use the fifth filter and to instruct a filtering operation by the fifth filter.

So, when the RB type #5 is selected, a multi-carrier device will alternately perform a filtering operation by the fifth filter in each of 12 sub-bands included in an RB 742.

In the operation described above, a frequency band which is filtered by one filter will be referred to as "sub-band". The sub-band may be defined by one or more sub-carriers. A sub-carrier may be defined as a unit element for configuring multi-carrier. For example, in FIG. 7, it will be assumed that each of allocated frequency bands 712, 722, 732, and 742 includes 12 sub-bands.

In a case that an RB type #1 is selected and a case that an RB type #2 is selected, physical mapping orders, i.e., operating orders, of filters to be used (the first filter and the second filter) are different even though the filters to be used are the same, these may be classified as different RB types. Out-of-band leakage requirement for a current RB may be varied according that which system or which RB is deployed at the left and the right of the current RB. This is why out-of-band radiation amount may be varied according to filters which are deployed at a left end and a right end.

For preventing effect due to a spectrum confinement characteristic in a multi-carrier device, there is a need to provide a space at the left and the right of an RB. So, as well as a configuration of an RB type in FIG. 7, it may be preferable for a BS to determine a size (e.g., a nulling value, a nulling number, and/or the like) of empty spaces which are located at the left and the right of an RB, and to provide the determined size to a multi-carrier device along with an RB type.

If a multi-carrier device pre-defines a size (e.g., a nulling value, a nulling number, and/or the like) of each of a left empty space and a right empty space to be applied per RB type, a BS does not need to determine a size of each of a left empty space and a right empty space and transmit the determined size to the multi-carrier device.

A process of configuring an RB type in FIG. 7 may be applied to a cellular internet of things (CIoT) operated in a guard band.

Another example of a process of configuring an RB type in a multi-carrier system according to an embodiment of the present disclosure has been described with reference to FIG. 7, and an example of an operation in a case that a resource operating scheme according to various embodiments of the present disclosure is implemented for a CIoT will be described with reference to FIG. 8.

Figure 8:
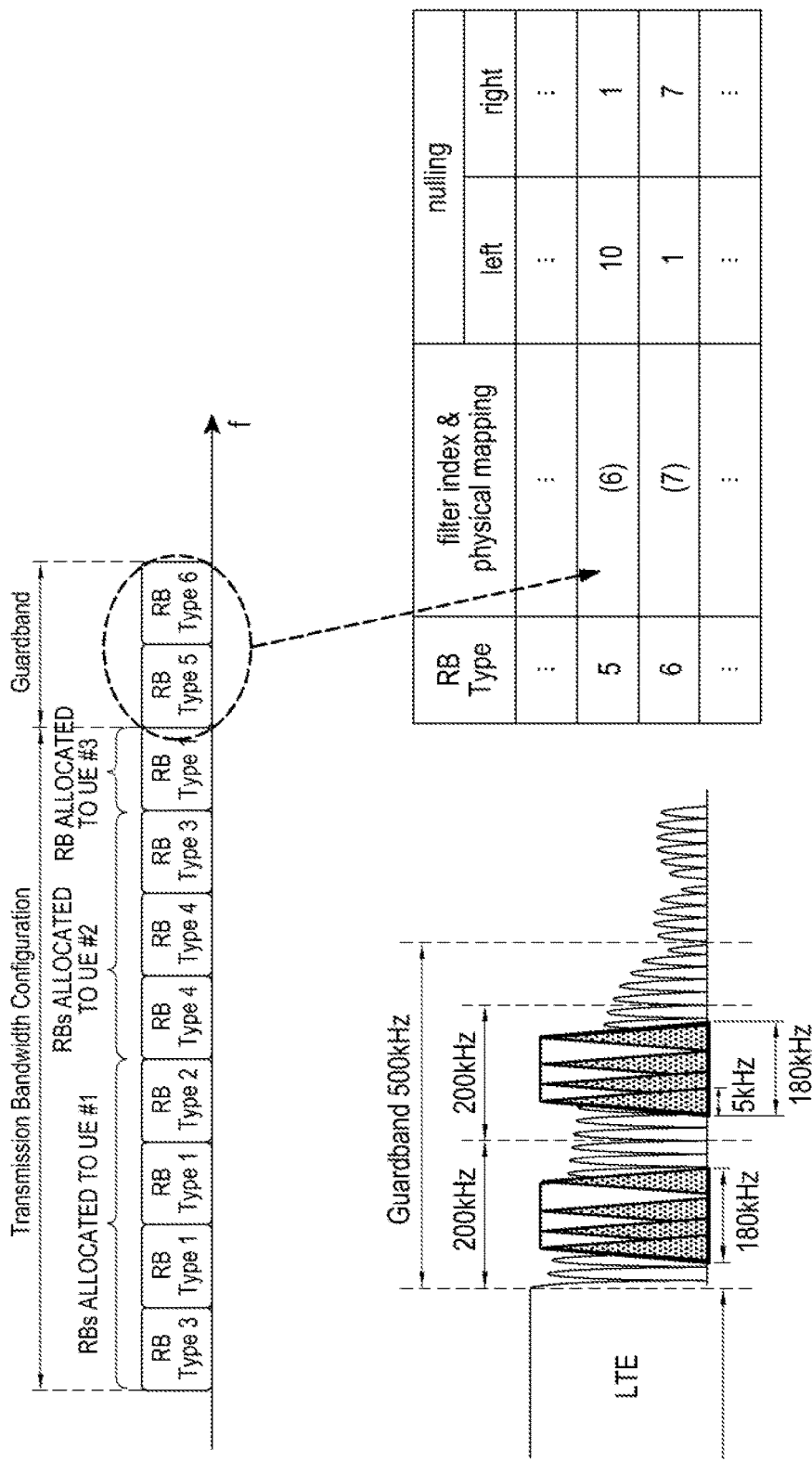
FIG. 8 schematically illustrates an example of an operation in a case that a resource operating scheme is implemented for a cellular internet of things (CIoT) according to various embodiments of the present disclosure.

FIG. 8 schematically illustrates an example of an operation in a case that a resource operating scheme is implemented for a CIoT according to various embodiments of the present disclosure.

Referring to FIG. 8, a guard band as a remaining band except for a transmission band among an entire channel band may be operated for a CIoT. That is, a resource may be operated according to various embodiments of the present disclosure in a transmission band, and a guard band other than the transmission band may be operated for a CIoT.

An example of an operation in a case that a resource operating scheme according to various embodiments of the present disclosure is implemented for a CIoT has been described with reference to FIG. 8, and an example of a resource operating process for supporting two communication schemes in a multi-carrier system according to an embodiment of the present disclosure will be described with reference to FIG. 9.

Figure 9:
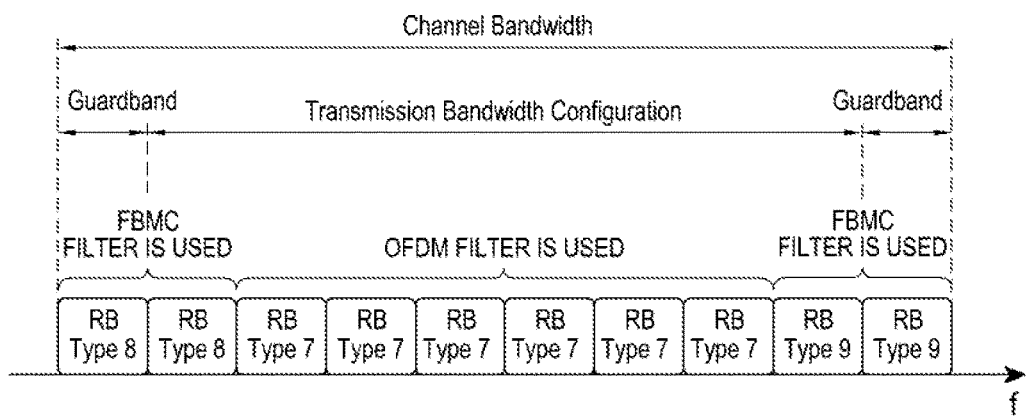
FIG. 9 schematically illustrates an example of a resource operating process for supporting two communication schemes in a multi-carrier system according to an embodiment of the present disclosure.

FIG. 9 schematically illustrates an example of a resource operating process for supporting two communication schemes in a multi-carrier system according to an embodiment of the present disclosure.

Referring to FIG. 9, an entire band is divided into an inner band and an outer band, and the inner band and the outer band may be operated as a resource for different communication schemes. For example, an inner band may be operated as a frequency resource for supporting an orthogonal frequency division multiplexing (OFDM) scheme, and an outer band may be operated as a frequency resource for supporting an FBMC scheme. This resource operation may be possible since a spectrum confinement characteristic of a filter supporting an FBMC scheme is good compared to a filter supporting an OFDM scheme. That the spectrum confinement characteristic is good means that symbol transmission is possible in an area used as a guard interval in an LTE of the related art.

An example of a resource operating process for supporting two communication schemes in a multi-carrier system according to an embodiment of the present disclosure has been described with reference to FIG. 9, and an inner structure of a BS in a multi-carrier system according to an embodiment of the present disclosure will be described with reference to FIG. 10.

Figure 10:
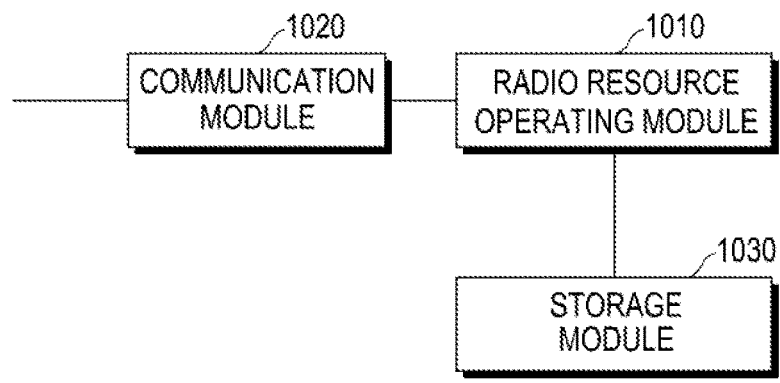
FIG. 10 schematically illustrates an inner structure of a BS in a multi-carrier system according to an embodiment of the present disclosure.

FIG. 10 schematically illustrates an inner structure of a BS in a multi-carrier system according to an embodiment of the present disclosure.

Referring to FIG. 10, the BS includes a radio resource operating module 1010, a communication module 1020, and a storage module 1030.

The communication module 1020 may perform a wireless communication for exchanging information with a UE. For example, the communication module 1020 may receive terminal state information transmitted by a UE and transmit resource allocation information for a resource allocated for the UE to the UE. The communication module 1020 may transmit, to the UE, information about an RB type determined for the UE. The information about the RB type may be a filter index indicating at least one filter to be used in the UE and information for enabling to recognize a physical mapping rule of a filter. The UE may acquire information about a left nulling number and a right nulling number in each RB based on the information about the RB type. The communication module 1020 may transmit, to the UE, the information about the left nulling number and the right nulling number as well as the information about the RB type.

The communication module 1020 may receive a signal transmitted by the UE based on the information about the RB type (including the information about the left nulling number and the right nulling number) provided to the UE.

The radio resource operating module 1010 may acquire resource allocation reference information which corresponds to one or more RBs to be allocated to the UE. The resource allocation reference information may include terminal state information, adjacent RB information, frequency selectivity of a channel, and/or the like. The terminal state information may be received from the UE through the communication module 1020. For example, the terminal state information may include a type of a filter usable in the UE, CQI, and/or the like. The adjacent RB information may include information about adjacent channel leakage requirement, and a used RB type in a target adjacent RB.

The radio resource operating module 1010 may determine an RB type to be used in each of the one or more RBs based on the acquired resource allocation reference information. The determined RB type may designate an index of a filter to be used in the UE and a physical mapping rule of a filter. The physical mapping rule of the filter may be used for defining an operating order of operating at least one filter which is allowed to use by an index of a filter. Further, the determined RB type may further designate a left nulling number and a right nulling number.

According to an embodiment of the present disclosure, with reference to FIG. 10, the radio resource operating module 1010 may select one or more RBs to be allocated to a UE in order, and select one of preset RB types based on resource allocation reference information acquired corresponding to the selected RB. The radio resource operating module 1010 may determine the selected RB type as an RB type for the selected RB.

According to an embodiment of the present disclosure, in a case that the same RB type is determined for at least two continuous RBs among a plurality of RBs to be allocated to a UE, the radio resource operating module 1010 may designate a nulling number for the first RB and the last RB in a frequency axis among the at least two continuous RBs. For example, the nulling number designated for the first RB may be a left nulling number, and the nulling number designated for the last RB may be a right nulling number.

The storage module 1030 may store a table which the radio resource operating module 1010 will use for determining an RB type. The table to be used for determining the RB type has been described above, so a detailed description thereof will be omitted herein.

While the radio resource operating module 1010, the communication module 1020, and the storage module 1030 are described in the BS as separate units, it is to be understood that this is merely for convenience of description. In other words, two or more of the radio resource operating module 1010, the communication module 1020, and the storage module 1030 may be incorporated into a single unit.

The BS may be implemented with one processor.

An inner structure of a BS in a multi-carrier system according to an embodiment of the present disclosure has been described with reference to FIG. 10, and an operating process of a BS in a multi-carrier system according to an embodiment of the present disclosure will be described with reference to FIG. 11.

Figure 11:
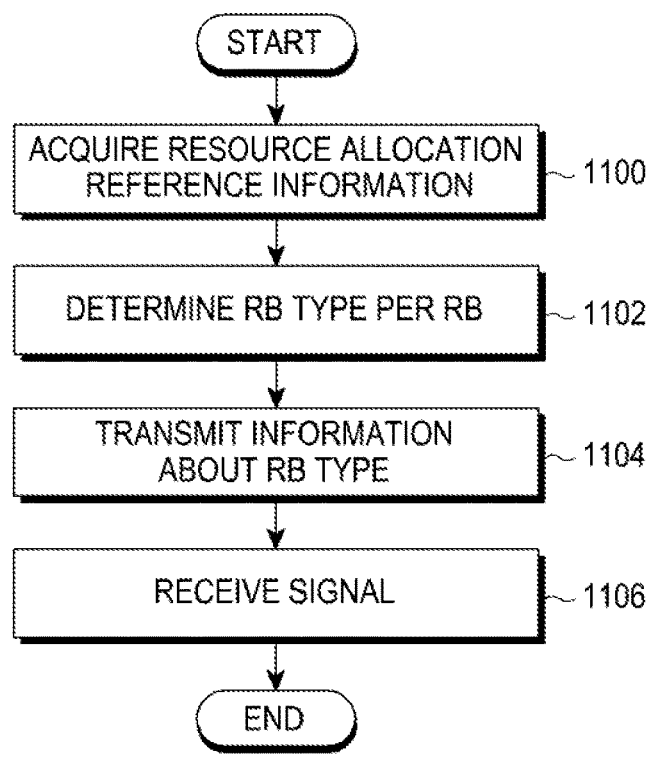
FIG. 11 schematically illustrates an operating process of a BS in a multi-carrier system according to an embodiment of the present disclosure.

FIG. 11 schematically illustrates an operating process of a BS in a multi-carrier system according to an embodiment of the present disclosure.

Referring to FIG. 11, a BS (e.g., the BS 200 or 600 in FIG. 2 or 6) may acquire resource allocation reference information which corresponds to one or more RBs to be allocated to a UE at operation 1100. The resource allocation reference information may include terminal state information, adjacent RB information, frequency selectivity of a channel, and/or the like. The BS may receive terminal state information from a UE. The terminal state information may include a type of a filter usable in a UE, CQI, and/or the like. The adjacent RB information may include information about adjacent channel leakage requirement and a used RB type in a target adjacent RB.

The BS may determine an RB type to be used in each of one or more RBs to be allocated to a UE based on the acquired resource allocation reference information at operation 1102. The determined RB type may designate a filter index to be used in a UE and a physical mapping rule of a filter. The physical mapping rule of the filter may be used for defining an operating order of operating at least one filter which is allowed to use by a filter index. The determined RB type may further designate a left nulling number and a right nulling number.

According to an embodiment of the present disclosure, the BS may select one or more RBs to be allocated to a UE in order, and select one of preset RB types based on resource allocation reference information acquired corresponding to the selected RB. The BS may determine the selected RB type as an RB type for the selected RB.

According to an embodiment of the present disclosure, in a case that the same RB type is determined for at least two continuous RBs among a plurality of RBs to be allocated to a UE, the BS may designate a nulling number for the first RB and the last RB in a frequency axis among the at least two continuous RBs. For example, the nulling number designated for the first RB may be a left nulling number, and the nulling number designated for the last RB may be a right nulling number.

The BS transmits information about an RB type to be used in each of one or more RBs to be allocated to a UE to the UE at operation 1104.

The BS may receive a signal transmitted by the UE based on the RB type transmitted to the UE for each of the one or more RBs at operation 1106.

Although FIG. 11 illustrates an operating process of a BS in a multi-carrier system according to an embodiment of the present disclosure, various changes could be made to FIG. 11. For example, although shown as a series of operations, various operations in FIG. 11 could overlap, occur in parallel, occur in a different order, or occur multiple times.

An operating process of a BS in a multi-carrier system according to an embodiment of the present disclosure has been described with reference to FIG. 11, and an inner structure of a UE in a multi-carrier system according to an embodiment of the present disclosure will be described with reference to FIG. 12.

Figure 12:
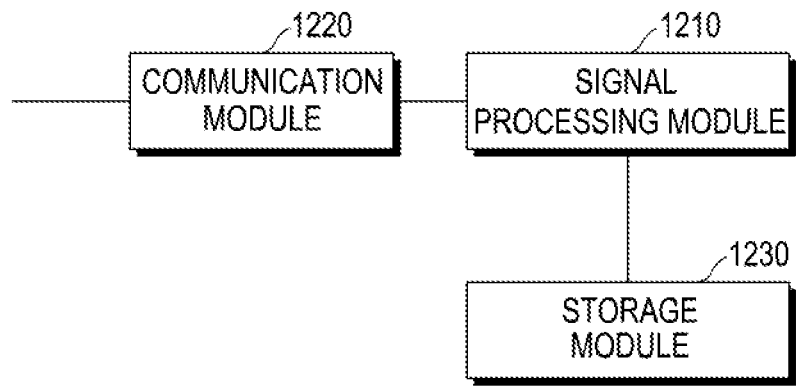
FIG. 12 schematically illustrates an inner structure of a UE in a multi-carrier system according to an embodiment of the present disclosure.

FIG. 12 schematically illustrates an inner structure of a UE (e.g., the UE 250 or 650 in FIG. 2 or 6) in a multi-carrier system according to an embodiment of the present disclosure.

Referring to FIG. 12, the UE includes a signal processing module 1210, a communication module 1220, and a storage module 1230.

The communication module 1220 may transmit terminal state information to a BS for requesting to provide information about an RB type which corresponds to each of one or more RBs. Here, the one or more RBs may be at least one RB which the BS will allocate to the UE.

The communication module 1220 may receive information about an RB type which corresponds to each of one or more RBs from a BS, and provide the received information about the RB type which corresponds to each of the one or more RBs to the signal processing module 1210. The communication module 1220 may transmit a signal in an RB to the BS based on at least one filter to be used, a physical mapping rule of the at least one filter, a left nulling number, and a right nulling number which are acquired by the signal processing module 1210.

The signal processing module 1210 receives information about an RB type which corresponds to each of one or more RBs provided from the BS through the communication module 1220. The signal processing module 1210 may acquire at least one filter to be used in each of the one or more RBs, a physical mapping rule of the at least one filter, a left nulling number, and a right nulling number based on information about an RB type which corresponds to each of the one or more RBs.

The signal processing module 1210 may transfer the acquired at least one filter, physical mapping rule, left nulling number, and right nulling number to the communication module 1220.

The storage module 1230 may store a table which manages at least one filter to be used, a physical mapping rule of the at least one filter, a left nulling number, and a right nulling number thereby using the information about the RB type output from the signal processing module 1210 to easily acquire the at least one filter, the physical mapping rule of the at least one filter, the left nulling number, and the right nulling number. The table has been described above, so a detailed description thereof will be omitted herein.

While the signal processing module 1210, the communication module 1220, and the storage module 1230 are described in the UE as separate units, it is to be understood that this is merely for convenience of description. In other words, two or more of the signal processing module 1210, the communication module 1220, and the storage module 1230 may be incorporated into a single unit.

The UE may be implemented with one or more processors.

An inner structure of a UE in a multi-carrier system according to an embodiment of the present disclosure has been described with reference to FIG. 12, and an operating process of a UE in a multi-carrier communication system according to an embodiment of the present disclosure will be described with reference to FIG. 13.

Figure 13:
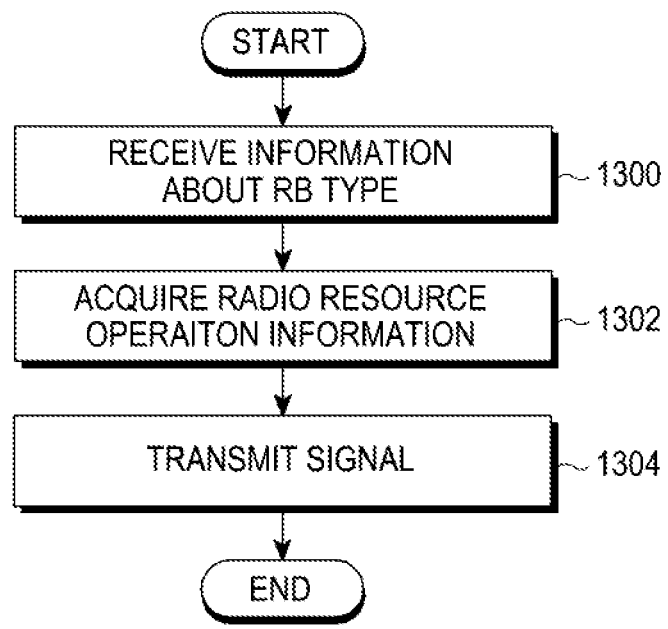
FIG. 13 schematically illustrates an operating process of a UE in a multi-carrier communication system according to an embodiment of the present disclosure.

FIG. 13 schematically illustrates an operating process of a UE in a multi-carrier communication system according to an embodiment of the present disclosure.

Referring to FIG. 13, a UE may receive information about an RB type which corresponds to each of one or more RBs from a BS at operation 1300. The UE may transmit terminal state information to the BS for receiving information about an RB type. Here, the one or more RBs may include at least one RB which the BS will allocate to the UE.

The UE may acquire at least one filter to be used in the one or more RBs, a physical mapping rule of the at least one filter, a left nulling number, and a right nulling number based on the received information about the RB type at operation 1302.

According to an embodiment of the present disclosure, a UE may acquire at least one filter to be used in each of one or more RBs, a physical mapping rule of the at least one filter, a left nulling number, and a right nulling number from a table which defines at least one filter to be used corresponding to each of RB types supportable in the UE, a physical mapping rule of the at least one filter, a left nulling number, and a right nulling number based on the received information about the RB type.

According to an embodiment of the present disclosure, a UE may acquire at least one filter to be used in each of one or more RBs, and a physical mapping rule of the at least one filter from a table which defines at least one filter to be used corresponding to each of RB types supportable in the UE, and a physical mapping rule of the at least one filter based on the received information about the RB type. The UE may acquire a left nulling number and a right nulling number to be used in each of one or more RBs based on the received information about the RB type.

The left nulling number and the right nulling number may be designated for the first RB and the last RB in a frequency axis among at least two continuous RBs of which the same RB type is determined among the plurality of RBs. For example, a nulling number designated for the first RB may be a left nulling number, and a nulling number designated for the last RB may be a right nulling number.

The UE may transmit a signal to the BS in an RB by considering the acquired at least one filter to be used, the physical mapping rule of the at least one filter, the left nulling number, and the right nulling number at operation 1304.

Although FIG. 13 illustrates an operating process of a UE in a multi-carrier communication system according to an embodiment of the present disclosure, various changes could be made to FIG. 13. For example, although shown as a series of operations, various operations in FIG. 13 could overlap, occur in parallel, occur in a different order, or occur multiple times. Hence, FIG. 13 is an example and the present disclosure is not limited thereto.

In accordance with various embodiments of the present disclosure, a method for transmitting a signal in a user equipment (UE) in a wireless communication system supporting multi-carrier is provided. The method includes receiving information related to a resource block (RB) type to be used in each of at least one RB from a base station (BS); acquiring information related to at least one filter to be used in each of the at least one RB, a physical mapping rule of the at least one filter, and a number of nullings for each of the at least one RB based on the information related to the RB type; and transmitting a signal to the BS in each of the at least one RB based on the acquired information related to the at least one filter to be used in each of the at least one RB, the physical mapping rule of the at least one filter, and the number of nullings for each of the at least one RB, wherein the at least one RB includes at least one RB to be allocated to the UE by the BS.

Preferably, the method further comprises transmitting state information to the BS for requesting the information related to the RB type related to each of the at least one RB.

Preferably, the state information includes information related to filters usable in the UE and channel quality information (CQI).

Preferably, the acquiring of the information related to the at least one filter to be used in each of the at least one RB, the physical mapping rule of the at least one filter, and the number of nullings for each of the at least one RB comprises acquiring the information related to the at least one filter to be used in each of the at least one RB, the physical mapping rule of the at least one filter, and the number of nullings for each of the at least one RB from a table that at least one filter to be used for each of RB types supportable in the UE, a physical mapping rule of the at least one filter, and a number of nullings for each of at least one RB based on the information related to the RB type.

Preferably, the acquiring of the information related to the at least one filter to be used in each of the at least one RB, the physical mapping rule of the at least one filter, and the number of nullings for each of the at least one RB comprises acquiring the information related to the at least one filter to be used in each of the at least one RB and the physical mapping rule of the at least one filter from a table which defines at least one filter to be used for each of RB types supportable in the UE, and a physical mapping rule of the at least one filter based on the information related to RB type; and acquiring the information related to the number of nullings to be used in each of the at least one RB from the information related to the RB type.

Preferably, if the at least one RB includes a plurality of RBs and the same RB type is determined for at least two continuous RBs among the plurality of RBs, a number of nullings is determined for a first RB and a last RB among the at least two continuous RBs in a frequency axis, and the number of nullings set for the first RB includes a number of nullings applied to a left of the first RB in the frequency axis, and the number of nullings set for the last RB includes a number of nullings applied to a right of the last RB in the frequency axis.

In accordance with various embodiments of the present disclosure, a BS in a wireless communication system supporting multi-carrier is provided. The BS includes a resource operating module configured to acquire reference information related to at least one RB to be allocated to a UE, and to determine an RB type to be used in the at least one RB based on the reference information; and a communication module configured to transmit, to the UE, information related to the RB type to be used in the at least one RB.

Preferably, the resource operating module selects one of a plurality of RB types based on the acquired reference information for each of the at least one RB, and determines the selected RB type as an RB type for each of the at least one RB.

Preferably, the communication module receives state information to be used as the reference information from the UE.

Preferably, the state information includes information related to filters usable in the UE and CQI.

Preferably, the reference information further includes adjacent RB information related to at least one adjacent RB which is adjacent to a target RB of which an RB type will be determined and frequency selectivity, and the adjacent RB information includes information related to adjacent channel leakage requirement in the target adjacent RB block and an RB type used in the target adjacent RB.

Preferably, the communication module receives a signal from the UE based on the RB type in each of the at least one RB.

Preferably, the RB type includes an index of a filter to be used in the UE and a physical mapping rule of the filter, and the physical mapping rule of the filter includes a rule related to an order for operating at least one filter which is allowed to use by the index of the filter.

Preferably, the RB type includes information related to a number of nullings for each of the at least one RB.

Preferably, the information related to the RB type further includes information related to a number of nullings to be used in each of the at least one RB.

Preferably, if the at least one RB includes a plurality of RBs and the same RB type is determined for at least two continuous RBs among the plurality of RBs, a number of nullings is determined for a first RB and a last RB among the at least two continuous RBs in a frequency axis, and the number of nullings set for the first RB includes a number of nullings applied to a left of the first RB in the frequency axis, and the number of nullings set for the last RB includes a number of nullings applied to a right of the last RB in the frequency axis.

In accordance with various embodiments of the present disclosure, a UE in a wireless communication system supporting multi-carrier is provided. The UE includes a communication module configured to transmit, to a BS, state information to be used as reference information related to at least one RB to be allocated to the UE, and to receive information related to an RB type to be used in the at least one RB from the BS, wherein the RB type is determined based on the reference information in the BS.

Preferably, one of a plurality of RB types is selected based on acquired reference information for each of the at least one RB, and the selected RB type is determined as an RB type for each of the at least one RB.

Preferably, the state information includes information related to filters usable in the UE and CQI.

Preferably, the reference information further includes adjacent RB information related to at least one adjacent RB which is adjacent to a target RB of which an RB type will be determined and frequency selectivity, and the adjacent RB information includes information related to adjacent channel leakage requirement in the target adjacent RB block and an RB type used in the target adjacent RB.

Preferably, the communication module transmits a signal to the BS based on the RB type in each of the at least one RB.

Preferably, the RB type includes an index of a filter to be used in the UE and a physical mapping rule of the filter, and the physical mapping rule of the filter includes a rule related to an order for operating at least one filter which is allowed to use by the index of the filter.

Preferably, the RB type includes information related to a number of nullings for each of the at least one RB.

Preferably, if the at least one RB includes a plurality of RBs and the same RB type is determined for at least two continuous RBs among the plurality of RBs, a number of nullings is determined for a first RB and a last RB among the at least two continuous RBs in a frequency axis, and the number of nullings set for the first RB includes a number of nullings applied to a left of the first RB in the frequency axis, and the number of nullings set for the last RB includes a number of nullings applied to a right of the last RB in the frequency axis.

Preferably, the information related to the RB type further includes information related to a number of nullings to be used in each of the at least one RB.

Preferably, if the at least one RB includes a plurality of RBs and the same RB type is determined for at least two continuous RBs among the plurality of RBs, a number of nullings is determined for a first RB and a last RB among the at least two continuous RBs in a frequency axis, and the number of nullings set for the first RB includes a number of nullings applied to a left of the first RB in the frequency axis, and the number of nullings set for the last RB includes a number of nullings applied to a right of the last RB in the frequency axis.

In accordance with various embodiments of the present disclosure, a UE in a wireless communication system supporting multi-carrier is provided. The UE includes a communication module configured to receive information related to an RB type to be used in each of at least one RB from a BS; and a signal processing module configured to acquire information related to at least one filter to be used in each of the at least one RB, a physical mapping rule of the at least one filter, and a number of nullings for each of the at least one RB based on the information related to the RB type, wherein the communication module transmits a signal to the BS in each of the at least one RB based on the acquired information related to the at least one filter to be used in each of the at least one RB, the physical mapping rule of the at least one filter, and the number of nullings for each of the at least one RB, and the at least one RB includes at least one RB to be allocated to the UE by the BS.

Preferably, the communication module transmits state information to the BS for requesting the information related to the RB type related to each of the at least one RB.

Preferably, the state information includes information related to filters usable in the UE and CQI.

Preferably, the acquiring of the information related to the at least one filter to be used in each of the at least one RB, the physical mapping rule of the at least one filter, and the number of nullings for each of the at least one RB comprises acquiring the information related to the at least one filter to be used in each of the at least one RB, the physical mapping rule of the at least one filter, and the number of nullings for each of the at least one RB from a table that at least one filter to be used for each of RB types supportable in the UE, a physical mapping rule of the at least one filter, and a number of nullings for each of at least one RB based on the information related to the RB type.

Preferably, the acquiring of the information related to the at least one filter to be used in each of the at least one RB, the physical mapping rule of the at least one filter, and the number of nullings for each of the at least one RB comprises acquiring the information related to the at least one filter to be used in each of the at least one RB and the physical mapping rule of the at least one filter from a table which defines at least one filter to be used for each of RB types supportable in the UE, and a physical mapping rule of the at least one filter based on the information related to RB type; and acquiring the information related to the number of nullings to be used in each of the at least one RB from the information related to the RB type.

Preferably, if the at least one RB includes a plurality of RBs and the same RB type is determined for at least two continuous RBs among the plurality of RBs, a number of nullings is determined for a first RB and a last RB among the at least two continuous RBs in a frequency axis, and the number of nullings set for the first RB includes a number of nullings applied to a left of the first RB in the frequency axis, and the number of nullings set for the last RB includes a number of nullings applied to a right of the last RB in the frequency axis.

As is apparent from the foregoing description, an embodiment of the present disclosure enables to operate a resource in a multi-carrier system.

An embodiment of the present disclosure enables to operate a resource based on self-interference amount and a spectrum confinement characteristic in a multi-carrier system.

An embodiment of the present disclosure enables to operate a resource thereby increasing symbol transmission efficiency in an FBMC system.

An embodiment of the present disclosure enables to transmit information related to an RB type determined based on a characteristic of a UE in a BS in a multi-carrier system.

An embodiment of the present disclosure enables to transmit a signal to a BS based on information related to an RB type received from the BS in a UE in a multi-carrier system.

An embodiment of the present disclosure enables to allocate an RB type appropriate for a situation of a UE thereby improving data transmission efficiency in a multi-carrier system which is based on an FBMC scheme, and/or the like.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc (CD)-ROMs, magnetic tapes, floppy disks, optical data storage devices, and carrier waves (such as data transmission through the internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a resource in a base station (BS) in a wireless communication system supporting multi-carrier, the method comprising:
    identifying reference information related to at least one resource block (RB) to be allocated to a user equipment (UE);
    determining an RB type to be used in the at least one RB based on the reference information; and
    transmitting, to the UE, information related to the RB type to be used in the at least one RB,
    wherein the RB type comprises a filter index for identifying at least one filter to be used in the at least one RB for supporting a filter bank multi-carrier (FBMC) transmission and a physical mapping rule for defining an operating order for operating the at least one filter.

2. The method of claim 1, wherein the determining of the RB type to be used in the at least one RB based on the reference information comprises:
    selecting one of a plurality of RB types based on the identified reference information for each of the at least one RB; and
    determining the selected RB type as an RB type for each of the at least one RB.

3. The method of claim 1,
    wherein the reference information further comprises adjacent RB information related to at least one adjacent RB which is adjacent to a target RB of which an RB type will be determined and frequency selectivity, and wherein the adjacent RB information comprises information related to an adjacent channel leakage requirement in a target adjacent RB and an RB type used in the target adjacent RB.

4. The method of claim 1, wherein the RB type comprises information related to a number of nullings for each of the at least one RB.

5. The method of claim 1,
wherein, if the at least one RB includes a plurality of RBs and the same RB type is determined for at least two continuous RBs among the plurality of RBs, a number of nullings is determined for a first RB and a last RB among the at least two continuous RBs in a frequency axis,
wherein the number of nullings set for the first RB comprises a number of nullings applied to a left of the first RB in the frequency axis, and
wherein the number of nullings set for the last RB comprises a number of nullings applied to a right of the last RB in the frequency axis.

6. A method for operating a resource in a user equipment (UE) in a wireless communication system supporting multi-carrier, the method comprising:
transmitting, to a base station (BS), state information to be used as reference information related to at least one resource block (RB) to be allocated to the UE; and
receiving information related to an RB type to be used in the at least one RB from the BS,
wherein the RB type comprises a filter index for identifying at least one filter to be used in the at least one RB for supporting a filter bank multi-carrier (FBMC) transmission and a physical mapping rule for defining an operating order for operating the at least one filter.

7. The method of claim 6,
wherein one of a plurality of RB types is selected based on identified reference information for each of the at least one RB, and
wherein the selected RB type is determined as an RB type for each of the at least one RB.

8. The method of claim 6,
wherein the reference information further comprises adjacent RB information related to at least one adjacent RB which is adjacent to a target RB of which an RB type will be determined and frequency selectivity, and
wherein the adjacent RB information comprises information related to an adjacent channel leakage requirement in a target adjacent RB and an RB type used in the target adjacent RB.

9. The method of claim 6, wherein the RB type comprises information related to a number of nullings for each of the at least one RB.

10. The method of claim 9,
wherein, if the at least one RB comprises a plurality of RBs and the same RB type is determined for at least two continuous RBs among the plurality of RBs, a number of nullings is determined for a first RB and a last RB among the at least two continuous RBs in a frequency axis, and
wherein the number of nullings set for the first RB comprises a number of nullings applied to a left of the first RB in the frequency axis, and the number of nullings set for the last RB comprises a number of nullings applied to a right of the last RB in the frequency axis.

11. The method of claim 6,
wherein, if the at least one RB comprises a plurality of RBs and the same RB type is determined for at least two continuous RBs among the plurality of RBs, a number of nullings is determined for a first RB and a last RB among the at least two continuous RBs in a frequency axis, and
wherein the number of nullings set for the first RB comprises a number of nullings applied to a left of the first RB in the frequency axis, and the number of nullings set for the last RB comprises a number of nullings applied to a right of the last RB in the frequency axis.

12. An apparatus for operating a resource in a base station (BS) of a wireless communication system supporting multi-carrier, the apparatus comprising:
a processor configured to identify reference information related to at least one resource block (RB) to be allocated to a user equipment (UE) and configured to determine an RB type to be used in the at least one RB based on the reference information; and
a transmitter configured to transmit, to the UE, information related to the RB type to be used in the at least one RB,
wherein the RB type comprises a filter index for identifying at least one filter to be used in the at least one RB for supporting a filter bank multi-carrier (FBMC) transmission and a physical mapping rule for defining an operating order for operating the at least one filter.

13. The apparatus of claim 12, wherein the processor is further configured to:
select one of a plurality of RB types based on the identified reference information for each of the at least one RB, and
determine the selected RB type as an RB type for each of the at least one RB.

14. The apparatus of claim 12,
wherein the reference information further comprises adjacent RB information related to at least one adjacent RB which is adjacent to a target RB of which an RB type will be determined and frequency selectivity, and
wherein the adjacent RB information comprises information related to an adjacent channel leakage requirement in a target adjacent RB and an RB type used in the target adjacent RB.

15. The apparatus of claim 12, wherein the RB type comprises information related to a number of nullings for each of the at least one RB.

16. The apparatus of claim 12,
wherein, if the at least one RB includes a plurality of RBs and the same RB type is determined for at least two continuous RBs among the plurality of RBs, a number of nullings is determined for a first RB and a last RB among the at least two continuous RBs in a frequency axis,
wherein the number of nullings set for the first RB comprises a number of nullings applied to a left of the first RB in the frequency axis, and
wherein the number of nullings set for the last RB comprises a number of nullings applied to a right of the last RB in the frequency axis.

17. An apparatus for operating a resource in a user equipment (UE) of a wireless communication system supporting multi-carrier, the apparatus comprising:
a transmitter configured to transmit, to a base station (BS), state information to be used as reference information related to at least one resource block (RB) to be allocated to the UE; and
a receiver configured to receive information related to an RB type to be used in the at least one RB from the BS, wherein the RB type comprises a filter index for identifying at least one filter to be used in the at least one RB for supporting a filter bank multi-carrier (FBMC) transmission and a physical mapping rule for defining an operating order for operating the at least one filter.

18. The apparatus of claim 17,
wherein one of a plurality of RB types is selected based on identified reference information for each of the at least one RB, and
wherein the selected RB type is determined as an RB type for each of the at least one RB.

19. The apparatus of claim 17,
wherein the reference information further comprises adjacent RB information related to at least one adjacent RB which is adjacent to a target RB of which an RB type will be determined and frequency selectivity, and
wherein the adjacent RB information comprises information related to an adjacent channel leakage requirement in a target adjacent RB and an RB type used in the target adjacent RB.

20. The apparatus of claim 17, wherein the RB type comprises information related to a number of nullings for each of the at least one RB.

21. The apparatus of claim 17,
wherein, if the at least one RB comprises a plurality of RBs and the same RB type is determined for at least two continuous RBs among the plurality of RBs, a number of nullings is determined for a first RB and a last RB among the at least two continuous RBs in a frequency axis, and
wherein the number of nullings set for the first RB comprises a number of nullings applied to a left of the first RB in the frequency axis, and the number of nullings set for the last RB comprises a number of nullings applied to a right of the last RB in the frequency axis.

22. The apparatus of claim 17,
wherein, if the at least one RB comprises a plurality of RBs and the same RB type is determined for at least two continuous RBs among the plurality of RBs, a number of nullings is determined for a first RB and a last RB among the at least two continuous RBs in a frequency axis, and
wherein the number of nullings set for the first RB comprises a number of nullings applied to a left of the first RB in the frequency axis, and the number of nullings set for the last RB comprises a number of nullings applied to a right of the last RB in the frequency axis.

* * * * *